United States Patent
Gomi et al.

(10) Patent No.: US 12,003,839 B2
(45) Date of Patent: Jun. 4, 2024

(54) IMAGING APPARATUS USING GHOST IMAGING

(71) Applicant: KOITO MANUFACTURING CO., LTD., Tokyo (JP)

(72) Inventors: Masato Gomi, Shizuoka (JP); Shintaro Sugimoto, Shizuoka (JP); Yuta Haruse, Shizuoka (JP); Teruaki Torii, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 213 days.

(21) Appl. No.: 17/506,277

(22) Filed: Oct. 20, 2021

(65) Prior Publication Data
US 2022/0038625 A1     Feb. 3, 2022

Related U.S. Application Data

(63) Continuation of application No. PCT/JP2020/017166, filed on Apr. 21, 2020.

(30) Foreign Application Priority Data

Apr. 22, 2019  (JP) ................................ 2019-081026
Apr. 22, 2019  (JP) ................................ 2019-081027

(51) Int. Cl.
*H04N 23/56* (2023.01)
*G01S 17/931* (2020.01)
(Continued)

(52) U.S. Cl.
CPC ........... *H04N 23/56* (2023.01); *G01S 17/931* (2020.01); *G02B 26/0833* (2013.01);
(Continued)

(58) Field of Classification Search
None
See application file for complete search history.

(56) References Cited

U.S. PATENT DOCUMENTS

2009/0238449 A1*  9/2009  Zhang .................... G06T 7/521
                                                   382/165
2010/0007660 A1*  1/2010  Forouhar ................. G06T 7/55
                                                   382/154
(Continued)

FOREIGN PATENT DOCUMENTS

CN    106324615 A    1/2017
CN    107110454 A    8/2017
(Continued)

OTHER PUBLICATIONS

Extended European Search Report dated May 11, 2022, issued in corresponding European Application No. 20794126.1. (11 pages).
(Continued)

*Primary Examiner* — Quan Pham
(74) *Attorney, Agent, or Firm* — BUCHANAN INGERSOLL & ROONEY PC

(57) ABSTRACT

An illumination apparatus irradiates first reference light having a first intensity distribution and second reference light having a second intensity distribution that has a complementary relation with the first intensity distribution. A photodetector measures reflected light from an object. A processing device executes a first correlation calculation using a first detection intensity based on the output of the photodetector in a state in which the first reference light is irradiated and the second intensity distribution, and executes a second correlation calculation using a second detection intensity based on the output of the photodetector in a state in which the second reference light is irradiated and the second intensity distribution.

13 Claims, 13 Drawing Sheets

(51) Int. Cl.

| | | |
|---|---|---|
| *G02B 26/08* | (2006.01) | |
| *G03B 15/05* | (2021.01) | |
| *G06T 5/70* | (2024.01) | |
| *G06T 7/521* | (2017.01) | |
| *G06V 10/141* | (2022.01) | |
| *G06V 10/143* | (2022.01) | |
| *G06V 10/145* | (2022.01) | |
| *G06V 20/56* | (2022.01) | |
| *H04N 23/80* | (2023.01) | |

(52) U.S. Cl.
CPC ............... *G03B 15/05* (2013.01); *G06T 5/70* (2024.01); *G06T 7/521* (2017.01); *G06V 10/141* (2022.01); *G06V 10/143* (2022.01); *G06V 10/145* (2022.01); *G06V 20/56* (2022.01); *H04N 23/80* (2023.01); *G06T 2207/20182* (2013.01)

(56) References Cited

U.S. PATENT DOCUMENTS

| | | | |
|---|---|---|---|
| 2013/0088726 A1 | 4/2013 | Goyal et al. | |
| 2017/0282785 A1 | 10/2017 | Albou et al. | |
| 2017/0357004 A1 | 12/2017 | Puente et al. | |
| 2018/0095165 A1 | 4/2018 | Cohen et al. | |
| 2018/0309941 A1* | 10/2018 | Lopez | H04N 23/11 |
| 2019/0176683 A1* | 6/2019 | Lim | B60Q 1/143 |

FOREIGN PATENT DOCUMENTS

| | | |
|---|---|---|
| CN | 108107441 A | 6/2018 |
| CN | 109343077 A | 2/2019 |
| JP | 2008070374 A | 3/2008 |
| JP | 2017525952 A | 9/2017 |
| JP | 2017204460 A | 11/2017 |
| JP | 6412673 B1 | 10/2018 |
| WO | 2016027797 A1 | 2/2016 |
| WO | 2017187484 A1 | 11/2017 |
| WO | 2020137908 A1 | 7/2020 |

OTHER PUBLICATIONS

Paunescu et al., "Compressive Sensing for Active Imaging in SWIR Spectral Range", Proceedings of SPIE; [Proceedings of SPIE; ISSN 0277-786X; vol. 8615], SPIE, 1000 20th St. Bellingham WA 98225-6705 USA, vol. 10796, Oct. 9, 2018, pp. 107960A-1-107960A-7, XP060112398.

Sun et al., "Differential Computational Ghost Imaging", Computational Optical Sensing and Imaging 2013, Jun. 23, 2013, pp. 1-3, XP055916731.

Zhang et al., "Wavelength-Multiplexing Ghost Imaging", Physical Review A (Atomic, Molecular, and Optical Physics), vol. 92, No. 1, Jul. 1, 2015, (3 pages), XP055916851.

International Search Report (PCT/ISA/210) and Written Opinion (PCT/ISA/237) with translations dated Jul. 21, 2020, by the Japan Patent Office as the International Searching Authority for International Application No. PCT/JP2020/017166.

Chan, Kam Wai Clifford et al., "Two-color ghost imaging", Physical Review A, Mar. 2009, vol. 79, pp. 1-6.

Shi, Dongfeng et al., "Polarimetric ghost imaging", Optics Letters, Mar. 1, 2014, vol. 39, No. 5, pp. 1231-1234.

Welsh, Stephen S. et al., "Fast full-color computational imaging with single-pixel detectors", Optics Express, Oct. 2013, vol. 21, No. 20, pp. 23068-23074.

Welsh, Stephen S. et al., "Multi-wavelength compressive computation ghost imaging", Proceedings SPIE 8618, Emerging Digital Micromirror Device Based Systems and Applications V, 2013, vol. 8618, pp. 1-6.

Office Action (Notice of Reasons for Refusal) dated Aug. 15, 2023, in corresponding Japanese Patent Application No. 2021-516126 and English translation of the Office Action. (9 pages).

Office Action (Notification of the First Office Action) issued on Mar. 4, 2024, in corresponding Chinese Patent Application No. 202080030716.X and English translation of the Office Action. (22 pages).

* cited by examiner

IMAGING APPARATUS USING GHOST IMAGING

BACKGROUND

1. Technical Field

The present disclosure relates to an imaging apparatus using ghost imaging.

2. Description of the Related Art

In order to support autonomous driving or autonomous control of the light distribution of a headlamp, an object identification system is employed for sensing the position and the kind of an object that exists in the vicinity of a vehicle. The object identification system includes a sensor and a processing device configured to analyze the output of the sensor. As such a sensor, a desired one is selected from among a camera, LiDAR (Light Detection and Ranging, Laser Imaging Detection and Ranging), millimeter-wave radar, ultrasonic sonar, etc., giving consideration to the usage, required precision, and cost.

As one from among imaging apparatuses (sensors), an imaging apparatus using the principle of ghost imaging is known. In ghost imaging, reference light is irradiated to an object while randomly switching the intensity distribution (pattern) of the reference light, and the light intensity of the reflected light is detected and measured for each pattern. The light intensity is detected as the energy over a given plane or the integrated value of the intensity. That is to say, the light intensity is not detected as an intensity distribution. With this, by calculating the correlation between each pattern and the detected light intensity, a reconstructed image of the object is obtained.

1. As a result of investigating an imaging apparatus, the present inventor has recognized the following problem. In order to obtain the correlation in ghost imaging, the correlation function represented by Expression (1) is employed. Here, $I_r$ represents the r-th (r=1, 2, . . . , M) intensity distribution of the reference light, and $b_r$ represents the value of the detection intensity when the reference light having the r-th intensity distribution is irradiated.

$$G(x, y) = \frac{1}{M} \sum_{r=1}^{M} [\{b_r - \langle b \rangle\} \cdot I_r(x, y)] \quad (1)$$

$$\langle b \rangle = \frac{1}{M} \sum_{r=1}^{M} b_r$$

FIG. 1 is a time chart showing a sensing operation of the imaging apparatus for one frame. As can be understood from Expression (1), one image is reconstructed by correlation calculation based on irradiating the reference light M times. With this arrangement, noise that differs from the reflected light from an object is input to a photodetector when the reference light is irradiated M times. Such noise leads to degradation in the image quality of the reconstructed image.

Furthermore, as a result of investigating such an imaging apparatus, the present inventor has recognized the following problem. That is to say, the pattern of the reference light is changed at random. However, in some cases, a satisfactory image is acquired based on a given pattern. However, in some cases, a degraded image is acquired based on a different pattern.

SUMMARY

1. An embodiment of the present disclosure relates to an imaging apparatus or an imaging method. The apparatus or method is configured such that first reference light having a first intensity distribution and second reference light having a second intensity distribution that has a complementary relation with the first intensity distribution are irradiated. In this state, reflected light from an object is measured. Subsequently, a first correlation calculation is executed based on a result of irradiation of the first reference light. Furthermore, a second correlation calculation is executed based on a result of irradiation of the second reference light.

2. Another embodiment of the present disclosure relates to an illumination apparatus. The illumination apparatus includes: a digital micromirror device (DMD) including multiple micromirrors that correspond to multiple pixels, and each structured to be tilted independently around a hinge axis in a first direction and a second direction; a first light source structured to irradiate a first input beam to the DMD; and a second light source structured to irradiate a second input beam to the DMD. The first input beam incident to the micromirror tilted in the first direction is projected to the exterior as a first output beam, and the first input beam incident to the micromirror tilted in the second direction is not projected to the exterior. In contrast, the second input beam incident to the micromirror tilted in the second direction is projected to the exterior as a second output beam, and the second input beam incident to the micromirror tilted in the first direction is not projected to the exterior. With this, the first output beam and the second output beam have complementary intensity distributions.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Overview of Embodiments

Figure 1:
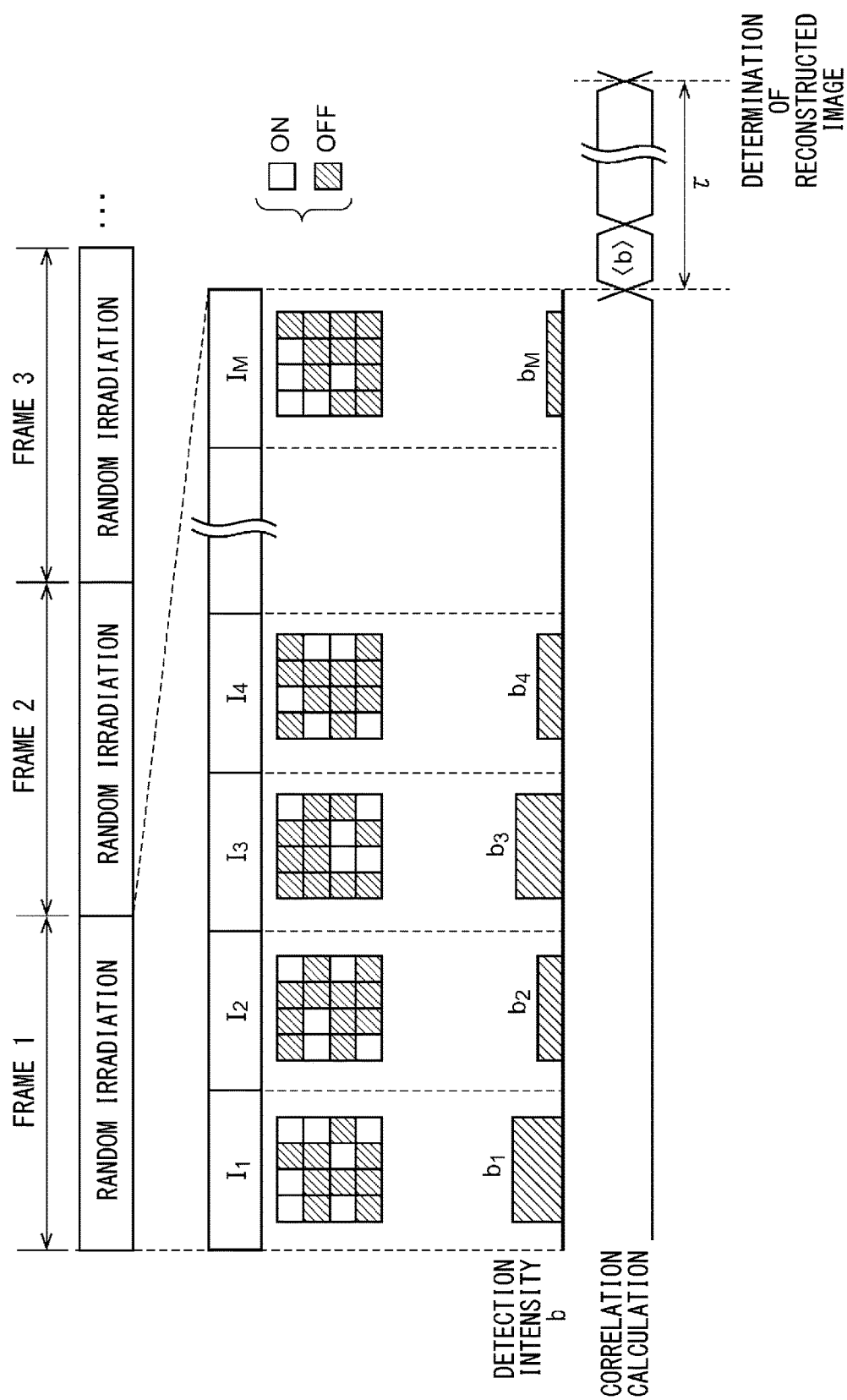
FIG. 1 is a time chart showing a sensing operation of an imaging apparatus for one frame.

Description will be made regarding the outline of several exemplary embodiments of the present disclosure. The outline is a simplified explanation regarding several concepts of one or multiple embodiments as a prelude to the detailed description described later in order to provide a basic understanding of the embodiments. That is to say, the outline described below is by no means intended to restrict the scope of the present invention and the present disclosure. Furthermore, the outline described below is by no means a comprehensive outline of all the possible embodiments. That is to say, the outline described below by no means restricts essential components of the embodiments. For convenience, in some cases, "one embodiment" as used in the present specification represents a single or multiple embodiments disclosed in the present specification.

The "random light intensity distribution" in the present specification does not necessarily mean that the light intensity distribution is completely random. Rather, the light intensity distribution may be random to an extent that allows an image to be reconstructed by ghost imaging. Accordingly, "random" in the present specification may include a certain degree of regularity. Also, "random" does not require the light intensity distribution to be completely unpredictable. That is to say, the light intensity distribution may also be predictable and reproducible.

1. One embodiment relates to an imaging apparatus. The imaging apparatus includes: an illumination apparatus structured to irradiate first reference light having a first intensity distribution and second reference light having a second intensity distribution that has a complementary relation with the first intensity distribution; a photodetector structured to measure reflected light from an object; and a processing device structured to perform first correlation calculation based on a result of irradiation of the first reference light and second correlation calculation based on a result of irradiation of the second reference light.

For example, the processing device may combine two correlation calculations so as to generate a final reconstructed image. This allows the noise effects contained as a common noise component in the first detection intensity and the second detection intensity to be canceled, thereby providing improved image quality.

Alternatively, the processing device may reconstruct a first reconstructed image by the first correlation calculation, and may reconstruct a second reconstructed image by the second correlation calculation. In this case, a reconstructed image having higher image quality may be selected as a final image from among the first reconstructed image and the second reconstructed image.

Also, the first reference light and the second reference light may have the same wavelength, and may be irradiated in a time-sharing manner.

Also, the first reference light may have a first wavelength, and the second reference light may have a second wavelength that differs from the first wavelength. Also, the photodetector may include: a first detector that is sensitive to the first wavelength, and not sensitive to the second wavelength, and a second detector that is sensitive to the second wavelength, and not sensitive to the first wavelength.

Also, the first reference light and the second reference light may be irradiated at the same time. This allows the frame rate to be increased.

Also, the illumination apparatus may include: a digital micromirror device (DMD); a first light source structured to irradiate a first input beam to the DMD; and a second light source structured to irradiate a second input beam to the DMD. A part of the first input beam incident to the micromirror tilted in the first direction is projected to the exterior as a first output beam, and the part of the first input beam incident to the micromirror tilted in the second direction is not projected to the exterior. In contrast, a part of the second input beam incident to the micromirror tilted in the second direction is projected to the exterior as a second output beam, and the part of the second input beam incident to the micromirror tilted in the first direction is not projected to the exterior. With this, when the first light source is turned on in a state in which a predetermined pattern is supplied to the DMD, first reference light having a first intensity distribution can be generated. Furthermore, when the second light source is turned on in this state, the second reference light having a second intensity distribution can be generated.

2. An embodiment relates to an illumination apparatus. The illumination apparatus can be employed in an imaging apparatus configured to reconstruct a reconstructed image by correlation calculation, for example. The illumination apparatus includes: a digital micromirror device (DMD) including multiple micromirrors that correspond to multiple pixels, and each structured to be tilted independently around a hinge axis in a first direction and a second direction; a first light source structured to irradiate a first input beam to the DMD; and a second light source structured to irradiate a second input beam to the DMD. The first input beam incident to the micromirror tilted in the first direction is projected to the exterior as a first output beam, and the first input beam incident to the micromirror tilted in the second direction is not projected to the exterior. In contrast, the second input beam incident to the micromirror tilted in the second direction is projected to the exterior as a second output beam, and the second input beam incident to the micromirror tilted in the first direction is not projected to the exterior. With this, the first output beam and the second output beam have complementary intensity distributions.

The illumination apparatus is capable of generating the output beams having complementary intensity distributions without changing the state of the micromirrors, i.e., without updating the image supplied to the DMD.

There may be a difference in the waveform between the first input beam and the second input beam. In this case, the first light source and the second light source may be turned on at the same time. With this, two output beams having complementary intensity distributions can be generated at the same time.

Also, the first input beam and the second input beam may have the same wavelength. In this case, the first light source and the second light source may be turned on in an exclusive manner. When two beams of reflected light from an object that correspond to the two output beams are detected, the two beams of reflected light can be separated based on the wavelength.

Also, the first output beam and the second output beam may be irradiated to a spatially overlapping region. In this case, noise can be canceled by subsequent signal processing.

Also, the first output beam and the second output beam may be irradiated to regions that do not overlap. This allows the illumination region to be expanded.

Also, the first input beam and the second input beam may each have a variable wavelength. This allows sensing and imaging to be adapted according to the color or material of a subject, or adapted according to the surrounding environment.

The illumination device according to an embodiment can be built into an automotive lamp.

An imaging apparatus is disclosed in an embodiment. The imaging apparatus includes: any one of the illumination apparatuses described above; a photodetector structured to measure reflected light from an object; and a processing device structured to execute a first correlation calculation based on a result of irradiation of the first output beam and a second correlation calculation based on a result of irradiation of the second output beam.

Also, the first output beam and the second output beam may be irradiated to a spatially overlapping region. Also, the processing device may combine the first correlation calculation and the second correlation calculation so as to generate a final reconstructed image. This allows the noise effects contained as a common noise component in the first detection intensity and the second detection intensity to be canceled.

EMBODIMENTS

Description will be made below regarding preferred embodiments with reference to the drawings. In each drawing, the same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

Figure 2:
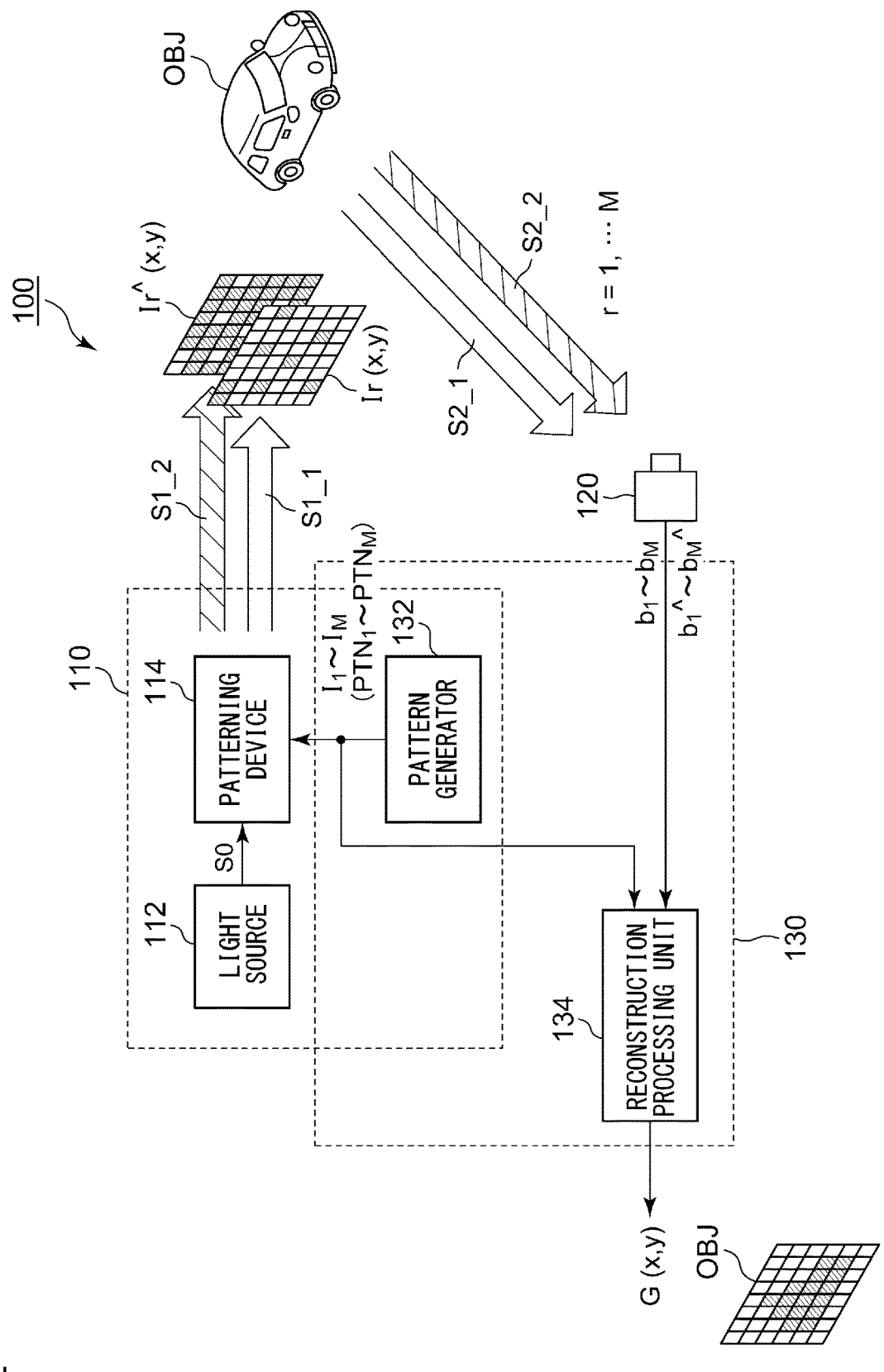
FIG. 2 is a diagram showing an imaging apparatus according to an embodiment 1.

FIG. 2 is a diagram showing an imaging apparatus 100 according to an embodiment 1. The imaging apparatus 100 is configured as a correlation function image sensor using the principle of ghost imaging. The imaging apparatus 100 includes an illumination apparatus 110, a photodetector 120, and a processing device 130. The imaging apparatus 100 will also be referred to as a "quantum radar camera".

The illumination apparatus 110 is configured as a pseudo-thermal light source. The illumination apparatus 110 generates reference light S1_1 having a first intensity distribution $I_r(x,y)$ that can be regarded as substantially random and a second reference light S1_2 having a second intensity distribution $I_r\hat{}(x,y)$ that has a complementary relation with the first intensity distribution $I_r(x,y)$. The illumination apparatus 110 irradiates the first and second reference light to an object OBJ. The first reference light S1_1 and the second reference light S1_2 are irradiated to the object OBJ with the intensity distribution I(x,y), which is changed at random a multiple of M times.

For example, the illumination apparatus 110 includes a light source 112, a patterning device 114, and a pattern generator 132. The light source 112 generates an input beam S0 having a uniform intensity distribution. The patterning device 114 has multiple pixels arranged in a matrix. The patterning device 114 is configured to be capable of spatially modulating the intensity distribution I of the input beam S0 based on the combination of the on/off states of the multiple pixels. In the present specification, a pixel set to the on state will be referred to as an "on pixel". On the other hand, a pixel set to the off state will be referred to as an "off pixel". It should be noted that, in the following description, for ease of understanding, description will be made assuming that each pixel is settable to only two values, i.e., 1 and 0. However, the present invention is not restricted to such an arrangement. Also, an arrangement may be made in which each pixel is switched at high speed between the on state and the off state, and the on/off time ratio is adjusted so as to provide an intermediate gradation. The output beams S1_1 and S1_2 to be reflected by the patterning device 114 are modulated such that they have complementary intensity distributions I(x,y).

The photodetector 120 measures the reflected light S2_1 from the object OBJ with respect to the first reference light S1_1, and outputs a first detection signal $D_r$. The first detection signal $D_r$ is a spatially integrated value of the light energy (or intensity) incident to the photodetector 120 when the first reference light S1_1 having a first intensity distribution $I_r$ is irradiated to the object OBJ. Accordingly, as the photodetector 120, a single-pixel photodetector may be employed. Multiple first detection signals $D_1$ through $D_M$ that respectively correspond to a plurality of M intensity distributions $I_1$ through $I_M$ are output from the photodetector 120.

Similarly, the photodetector 120 measures the reflected light S2_2 from the object OBJ with respect to the second reference light S1_2, and outputs a second detection signal $D_r\hat{}$. Multiple second detection signals $D_1\hat{}$ through $D_M\hat{}$ that respectively correspond to a plurality of M intensity distributions $I_1\hat{}$ through $I_M\hat{}$ are output from the photodetector 120.

The processing device 130 includes the pattern generator 132 and a reconstruction processing unit 134. The reconstruction processing unit 134 acquires a correlation between the multiple first intensity distributions (which will also be referred to as "random patterns") $I_1$ through $I_M$ and the multiple first detection intensities $b_1$ through $b_M$ (first correlation calculation). The first detection intensities $b_1$ through $b_M$ are obtained based on the detection signals $D_1$ through $D_M$. The relation between the detection intensity and the detection signal may be determined giving consideration to the kind and the detection method of the photodetector 120.

$$G_1(x, y) = \frac{1}{M}\sum_{r=1}^{M} [\{b_r - \langle b \rangle\} \cdot I_r(x, y)] \quad (2)$$

$$\langle b \rangle = \frac{1}{M}\sum_{r=1}^{M} b_r$$

Furthermore, the reconstruction processing unit 134 acquires a correlation between the multiple second intensity distributions $I_1\hat{}$ through $I_M\hat{}$ and the multiple second detection intensities $b_1\hat{}$ through $b_M\hat{}$ (second correlation calculation). The second intensity distributions $I_1\hat{}$ through $I_M\hat{}$ can be calculated based on the first intensity distributions $I_1$ through $I_M$. The second detection intensities $b_1\hat{}$ through $b_M\hat{}$ are acquired based on the second detection signals $D_1\hat{}$ through $D_M\hat{}$.

$$G_2(x, y) = \frac{1}{M}\sum_{r=1}^{M} [\{b_r\hat{} - \langle b\hat{} \rangle\} \cdot I_r\hat{}(x, y)] \quad (3)$$

$$\langle b^{\wedge} \rangle = \frac{1}{M} \sum_{r=1}^{M} b_r^{\wedge}$$

The reconstruction processing unit 134 calculates Expression (4) so as to generate a final reconstructed image G(x,y). Expression (4) is a composite correlation function obtained by combining the first correlation calculation expression represented by Expression (2) and the second correlation calculation expression represented by Expression (3).

$$G(x, y) = G_1(x, y) + G_2(x, y) = \qquad (4)$$

$$\frac{1}{M} \sum_{r=1}^{M} [\{b_r - \langle b \rangle\} \cdot I_r(x, y) + \{b_r^{\wedge} - \langle b^{\wedge} \rangle\} \cdot I_r^{\wedge}(x, y)]$$

Figure 3:
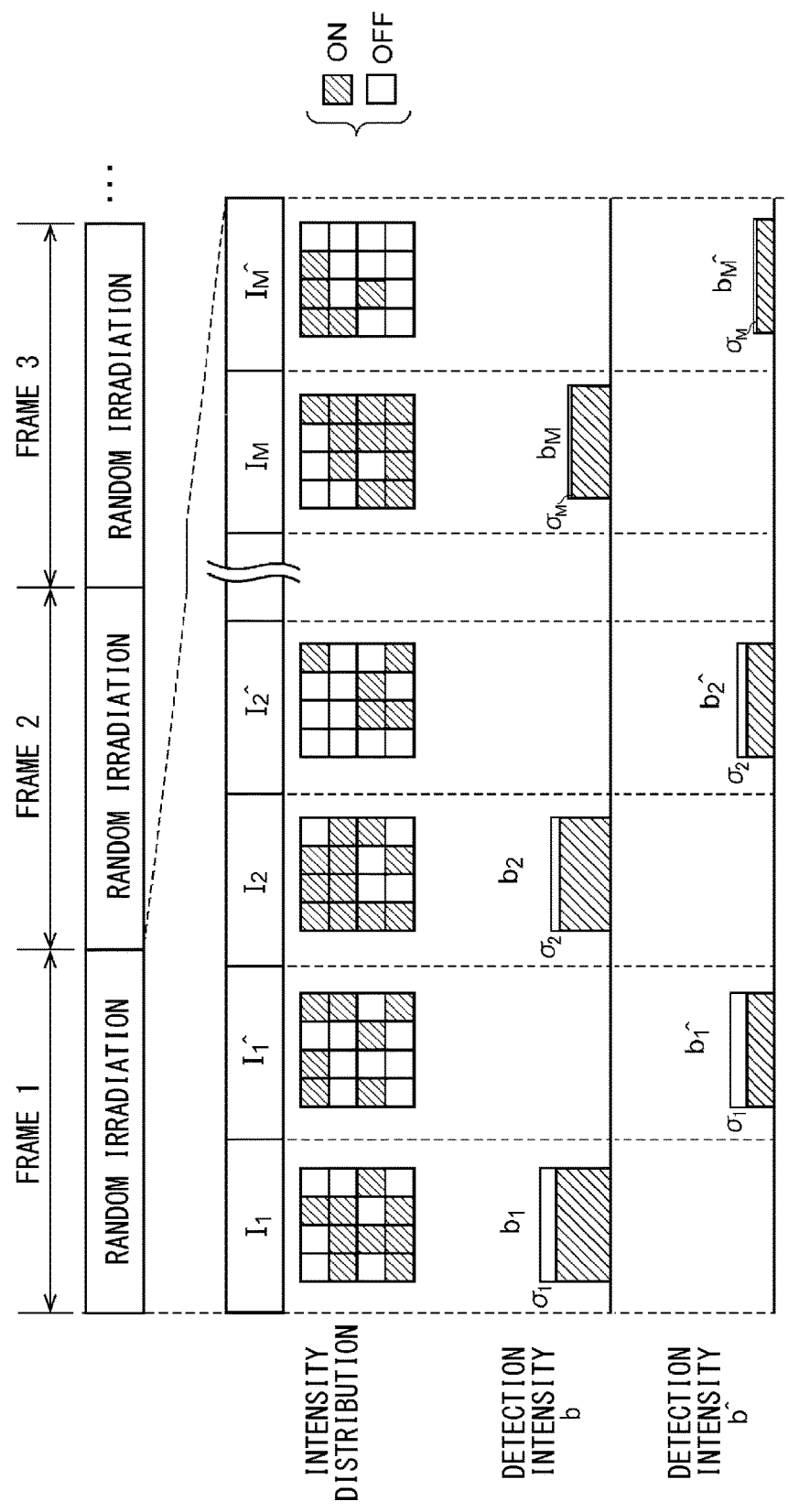
FIG. 3 is a time chart for explaining the operation of the imaging apparatus shown in FIG. 2.

The above is the configuration of the imaging apparatus 100. Next, description will be made regarding the operation thereof. FIG. 3 is a time chart for explaining the operation of the imaging apparatus 100 shown in FIG. 2. Description will be made below regarding an arrangement in which the first reference light S1_1 and the second reference light S1_2 are alternately irradiated in a time sharing manner.

The first detection intensity $b_r$ is acquired every time the first reference light S1_1 is irradiated. Furthermore, the second detection intensity $b_r^{\wedge}$ is acquired every time the second reference light S1_2 is irradiated. Each detection intensity includes a noise component u. The reconstruction processing unit 134 calculates the composite correlation expression represented by Expression (4) based on the first detection intensities $b_r$, the second detection intensities $b_r$A, the first intensity distributions $I_r(x,y)$, and the second intensity distributions $I_r^{\wedge}(x,y)$ acquired for r=1 to M, thereby acquiring a final reconstructed image G(x,y).

The above is the operation of the imaging apparatus 100. Next, description will be made regarding the advantages thereof.

Description will be made below regarding an example in which each intensity distribution is settable to a binary value, i.e., 0 or 1. In this example, the following Expression (5) holds true with respect to the first intensity distribution $I_r(x,y)$ and the second intensity distribution $I_r^{\wedge}(x,y)$.

$$I_r^{\wedge}(x,y) = 1 - I_r(x,y) \qquad (5)$$

Expressions (2), (3), and (5) are substituted into Expression (4), thereby acquiring the following Expression (6).

$$G(x, y) = \frac{1}{M} \sum_{r=1}^{M} [\{b_r - \langle b \rangle\} \cdot I_r(x, y)] + \frac{1}{M} \sum_{r=1}^{M} [\{b_r^{\wedge} - \langle b^{\wedge} \rangle\} \cdot I_r^{\wedge}(x, y)] = \qquad (6)$$

$$\frac{1}{M} \sum_{r=1}^{M} [\{b_r - \langle b \rangle\} \cdot I_r(x, y)] +$$

$$\frac{1}{M} \sum_{r=1}^{M} \{b_r^{\wedge} - \langle b^{\wedge} \rangle\} - \frac{1}{M} \sum_{r=1}^{M} [\{b_r^{\wedge} - \langle b^{\wedge} \rangle\} \cdot I_r(x, y)]$$

Here, $\langle b_r^{\wedge} \rangle$ represents the average value of $b_r^{\wedge}$. Accordingly, the following Expression (7) holds true.

$$\frac{1}{M} \sum_{r=1}^{M} \{b_r^{\wedge} - \langle b^{\wedge} \rangle\} = 0 \qquad (7)$$

After substituting Expression (7) into Expression (6), the expression thus obtained is rearranged, thereby obtaining the following Expression (8).

$$G(x, y) = \frac{1}{M} \sum_{r=1}^{M} [\{b_r - \langle b \rangle\} \cdot I_r(x, y)] - \frac{1}{M} \sum_{r=1}^{M} [\{b_r^{\wedge} - \langle b^{\wedge} \rangle\} \cdot I_r(x, y)] = \qquad (8)$$

$$\frac{1}{M} \sum_{r=1}^{M} [\{b_r - b_r^{\wedge} + \langle b^{\wedge} \rangle - \langle b \rangle\} \cdot I_r(x, y)]$$

Here, $b_r$ and $b_r^{\wedge}$ are each represented by the sum of a true signal component (with a suffix of "(true)") due to the reflected light and a noise component σ. Description will be made assuming that $b_r$ and $b_r^{\wedge}$ contain the same noise component $\sigma_r$.

$$b_r = b_{r(true)} + \sigma_r$$

$$b_r^{\wedge} = b_{r(true)}^{\wedge} + \sigma_r$$

These are substituted into Expression (8), thereby obtaining the following Expression (9).

$$G(x, y) = \frac{1}{M} \sum_{r=1}^{M} [\{b_{r(true)} - b_{r(true)}^{\wedge} + \langle b_{(true)}^{\wedge} \rangle - \langle b_{(true)} \rangle\} \cdot I_r(x, y)] \qquad (9)$$

As can be understood from Expression (9), the image G(x,y) is acquired in the final stage after the noise components cancel each other out. Accordingly, the image G(x,y) contains only the signal components $b_{r(true)}$ and $b_{r(true)}^{\wedge}$, thereby providing improved image quality.

Modification 1

Description has been made with reference to FIG. 3 regarding an arrangement in which the beams of reference light S1_1 and S1_2 are alternately irradiated. However, the present invention is not restricted to such an arrangement. In a case in which the photodetector 120 is capable of separating the corresponding beams of reflected light S2_1 and S2_2 even if the beams of reference light S1_1 and S1_2 are irradiated at the same time, the beams of reference light S1_1 and S1_2 may be irradiated at the same time.

For example, the first reference light S1_1 may be designed to have a first wavelength $\lambda_1$, and the second reference light S1_2 may be designed to have a second wavelength $\lambda_2$. In this case, the photodetector 120 may include a first photodetector having sensitivity with respect to the first wavelength $\lambda_1$, and a second photodetector having sensitivity with respect to the second wavelength $\lambda_2$. Alternatively, the beams of reflected light S2_1 and S2_2 may be separated by means of a filter. Subsequently, the two components S2_1 and S2_2 thus separated may be measured with respect to the intensity.

It should be noted that, in a case in which there is a large difference between the first wavelength $\lambda_1$ and the second wavelength $\lambda_2$, this leads to a large difference in the reflection ratio with respect to the same object between the first wavelength $\lambda_1$ and the second wavelength $\lambda_2$. In this case, reflection ratio correction may preferably be performed.

In order to provide the reflection ratio correction, the first reference light S1_1 having the first wavelength $\lambda_1$ is irradiated to an object with a uniform intensity distribution (e.g., all pixels are a maximum intensity or 1), and the detection intensity $b_0$ is acquired in this state. Furthermore, the second reference light S1_2 having the second wavelength $\lambda_2$ is irradiated to the same object with the same intensity distribution (it should be noted that it has no complementary relation with the first reference light S1_1), and the detection intensity $b_0\hat{\,}$ is acquired in this state. The detection intensities $b_0$ and $b_0\hat{\,}$ are proportional to the reflection ratios of the object with respect to the wavelengths $\lambda_1$ and $\lambda_2$, respectively. The processing device 130 corrects at least one from among the first detection intensity $b_r$ and the second detection intensity $b_r\hat{\,}$ acquired in the subsequent operations using $b_0$ and $b_0\hat{\,}$ thus acquired.

For example, $b_r$ may be used as it is, and $b_r\hat{\,}$ may be multiplied by the coefficient $b_0\hat{\,}/b_0$ so as to obtain a corrected detection intensity $b_r\hat{\,}$. That is to say, the correlation calculation may be performed using $b_r$ without correction and $b_r\hat{\,}$ thus corrected. Conversely, $b_r\hat{\,}$ may be used as it is, and $b_r$ may be corrected by multiplying $b_r$ by the coefficient $b_0/b_0\hat{\,}$. That is to say, the correlation calculation may be performed using $b_r$ thus corrected and $b_r\hat{\,}$ without correction.

Alternatively, in a case in which the intensity of the input beam S0 before patterning can be adjusted, the light intensity to be generated by the light source 112 may be corrected. In this case, the input beam S0 having the first wavelength $\lambda_1$ may be used without adjustment, and the intensity of the input beam S0 having the second wavelength $\lambda_2$ may be multiplied by $b_0\hat{\,}/b_0$. Conversely, the input beam S0 having the second wavelength $\lambda_2$ may be used without adjustment, and the intensity of the input beam S0 having the first wavelength $\lambda_1$ may be multiplied by $b_0/b_0\hat{\,}$.

Modification 2

The first reference light S1_1 and the second reference light S1_2 may have the same wavelength and different polarization characteristics. For example, one from among the first reference light S1_1 and the second reference light S1_2 may have clockwise circular polarization (or elliptical polarization), and the other reference light may have counterclockwise circular polarization (or elliptical polarization).

In this case, the illumination apparatus 110 may include an optical system that separates the clockwise polarization component and the counterclockwise polarization component. Such an optical system that separates the polarization components can be configured as a combination of a quarter-wave plate and a linear polarization element.

Modification 3

The reconstruction processing unit 134 may calculate the first correlation expression represented by Expression (2) using the results of M irradiations of the first reference light S1_1, so as to reconstruct the first reconstructed image $G_1(x,y)$. Also, the reconstruction processing unit 134 may calculate the second correlation expression represented by Expression (3) using the results of M irradiations of the second reference light S1_2, so as to reconstruct the second reconstructed image $G_2(x,y)$. Subsequently, each pair of the corresponding pixels of the two reconstructed images $G_1(x,y)$ and $G_2(x,y)$ may be added so as to generate a final reconstructed image $G(x,y)$. In this case, such an arrangement is also capable of canceling the noise effects.

Modification 4

Description has been made above regarding examples in which the two patterns having complementary intensity distributions are used for the noise cancelation. However, the present invention is not restricted to such examples. In a modification 4, the reconstruction processing unit 134 calculates the first correlation expression represented by Expression (2) using the results of M irradiations of the first reference light S1_1, so as to reconstruct the first reconstructed image $G_1(x,y)$. Furthermore, the reconstruction processing unit 134 calculates the second correlation expression represented by Expression (3) using the results of M irradiations of the second reference light S1_2, so as to reconstruct the second reconstructed image $G_2(x,y)$.

Subsequently, from among the two reconstructed images $G_1(x,y)$ and $G_2(x,y)$, the reconstructed image having a higher image quality may be selected as the final reconstructed image. For example, the reconstructed image including an object having a clear edge may be selected. This arrangement provides no noise cancelation effect. However, such an arrangement is capable of selecting a more suitable pattern with respect to a subject, thereby providing improved image quality.

Next, description will be made regarding the configuration of the illumination apparatus 110 based on several examples.

Example 1

Figure 4:
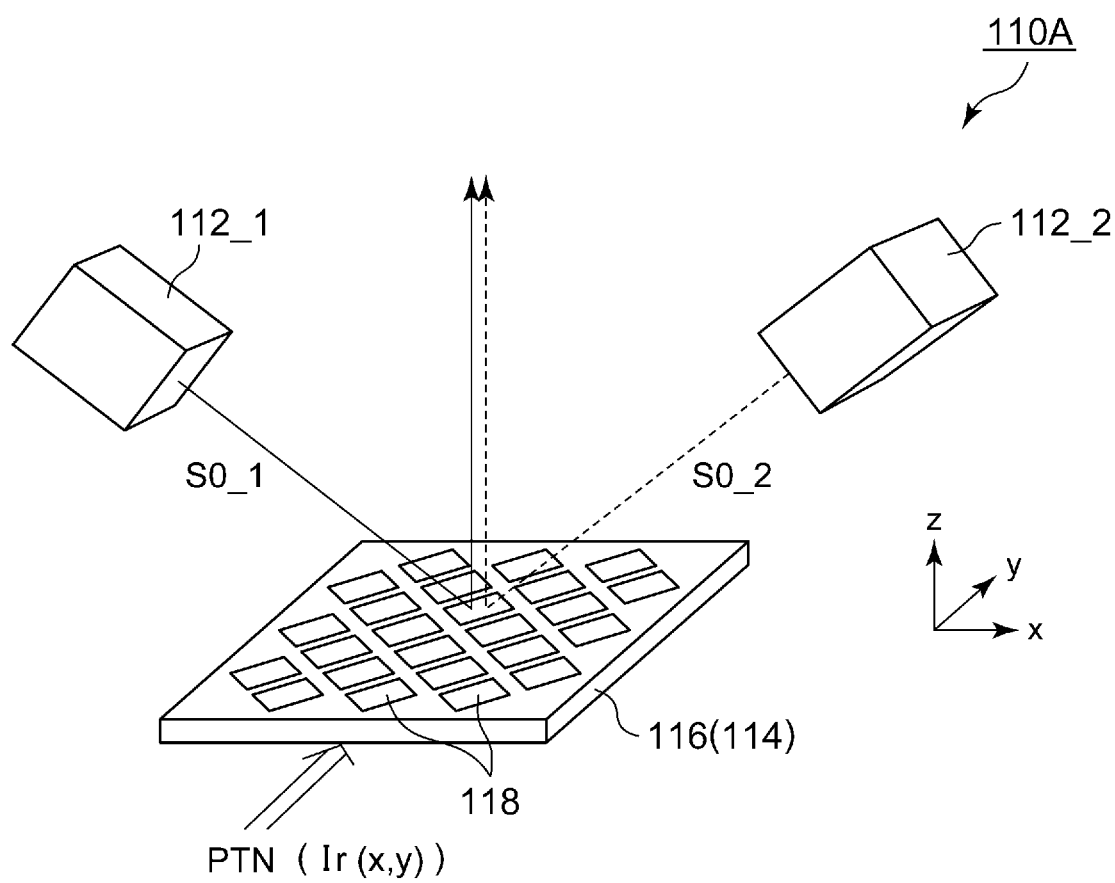
FIG. 4 is a diagram showing an illumination apparatus according to an example 1.

FIG. 4 is a diagram showing an illumination apparatus 110A according to an example 1. The illumination apparatus 110A includes a first light source 112_1, a second light source 112_2, and a DMD 116 configured as a patterning device 114. The light sources 112_1 and 112_2 generate input beams S0_1 and S0_2, respectively, each having a uniform intensity distribution. As such a light source 112, a laser, light-emitting diode, or the like may be employed. The wavelength and the spectrum of each of the input beams S0_1 and S0_2 are not restricted in particular. As the input beam, white light having multiple wavelengths or a continuous spectrum may be employed. Also, monochromatic light having a predetermined wavelength may be employed. The input beams S0_1 and S0_2 may also have a wavelength in the infrared region or ultraviolet region.

Figure 5:
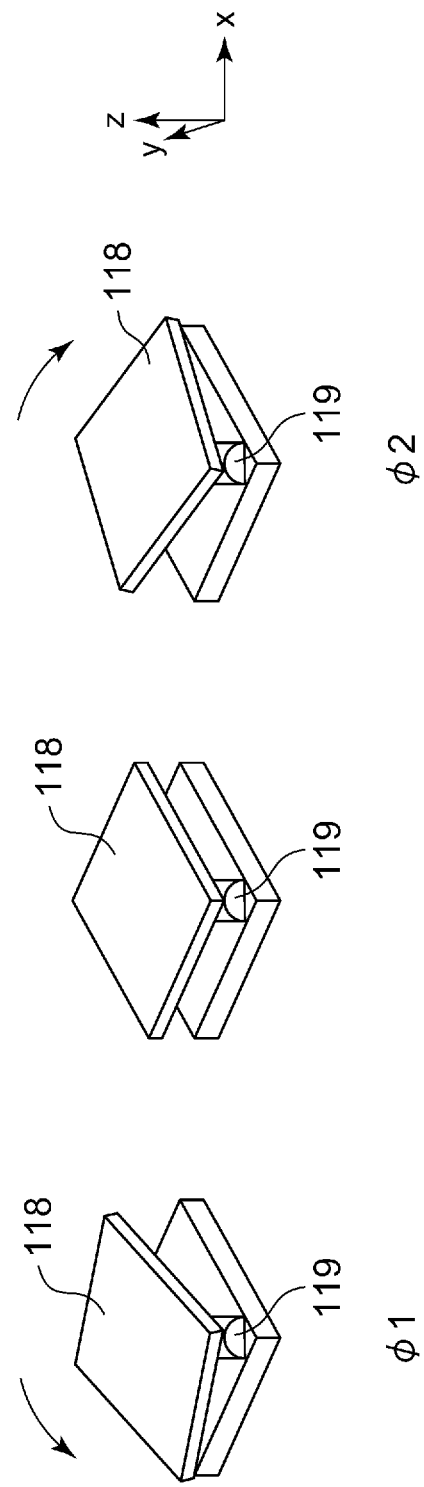
FIG. 5 is a diagram showing a structure of a DMD.

The DMD 116 includes multiple micromirrors 118 that correspond to the multiple pixels. FIG. 5 is a diagram showing a structure of the DMD 116. Each micromirror 118 is configured such that it is independently tilted around a hinge axis 119 in the first direction (counterclockwise direction in the drawing) and a second direction (clockwise direction in the drawing). Here, a state in which the micromirror is tilted in the first direction will be referred to as a "state $\phi$1", and a state in which the micromirror is tilted in the second direction will be referred to as a "state $\phi$2".

Figure 6:
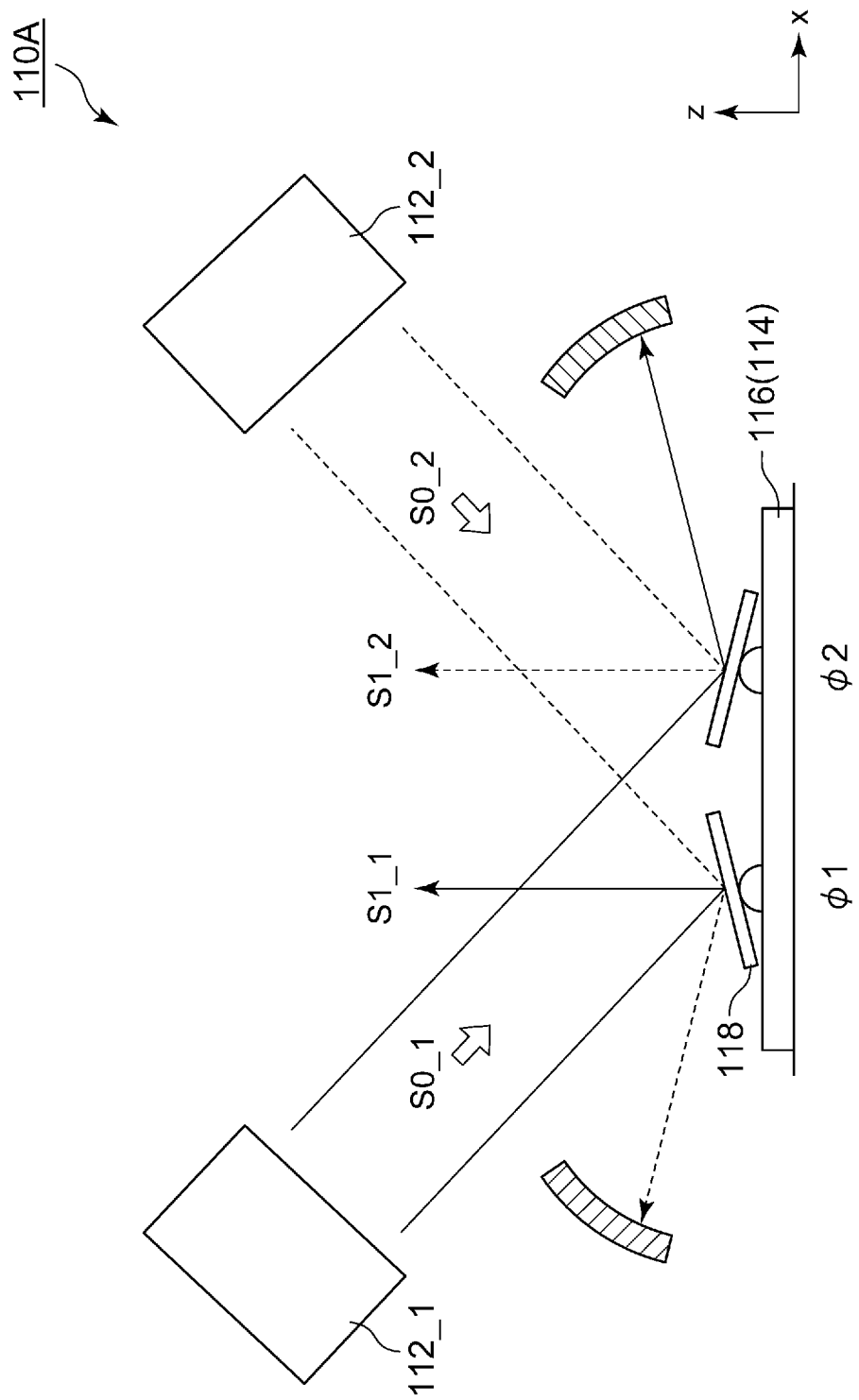
FIG. 6 is a cross-sectional diagram showing a position relation between a first light source, a second light source, and the DMA included in the illumination apparatus according to the example 1.

FIG. 6 is a cross-sectional diagram showing the position relation between the first light source 112_1, the second light source 112_2, and the DMD 116 included in the illumination apparatus 110A according to the example 1. The two light sources 112_1 and 112_2 are arranged such that they satisfy the following relation.

When a given micromirror 118 is tilted in the first direction and is set to the state $\phi$1, a part (light flux) of the input beam S0_1 incident to the micromirror 118 is projected to the exterior as a part of the first output beam (first reference light). In contrast, when a given micromirror 118 is tilted in the second direction and is set to the state ϕ2, the part of the input beam S0_1 incident to the micromirror 118 is not projected to the exterior, i.e., the part of the input beam S0_1 is blocked.

Conversely, when a given micromirror 118 is tilted in the second direction and is set to the state ϕ2, a part of the input beam S0_2 incident to the micromirror 118 is projected to the exterior as a part of the second output beam (second reference light). In contrast, when a given micromirror 118 is tilted in the first direction and is set to the state ϕ1, the part of the input beam S0_2 incident to the micromirror 118 is not projected to the exterior, i.e., the part of the input beam S0_2 is blocked.

The input beams S0_1 and S0_2 incident to the same pixel (micromirror) are reflected in substantially the same direction. With this, the two output beams S1_1 and S1_2 are irradiated to substantially the same region.

The above is the configuration of the imaging apparatus 100A according to the example 1. With the imaging apparatus 100A, the first light source 112_1 and the second light source 112_2 are sequentially turned on in a state in which a given pattern (image) is supplied to the DMD 116. This allows the beams of reference light S1_1 and S1_2 having complementary intensity distributions to be generated.

In a case in which the two beams of reference light S1_1 and S1_2 are irradiated at the same time, the two light sources 112_1 and 112_2 may preferably be turned on at the same time. In this case, the two light sources 112_1 and 112_2 may provide different wavelengths. Also, the two light sources 112_1 and 112_2 may provide different polarization characteristics.

In a case in which the two beams of reference light S1_1 and S1_2 are irradiated at the same time, the two light sources 112_1 and 112_2 may preferably be turned on in sequence.

Also, with the illumination apparatus 110A, the two beams S1_1 and S1_2 may be generated such that they have complementary intensity distributions without changing the state of the micromirrors 118, i.e., without updating the image supplied to the DMD 116.

It should be noted that the usage of the illumination apparatus 110A is not restricted to the imaging apparatus based on correlation calculation.

Example 2

Figure 7:
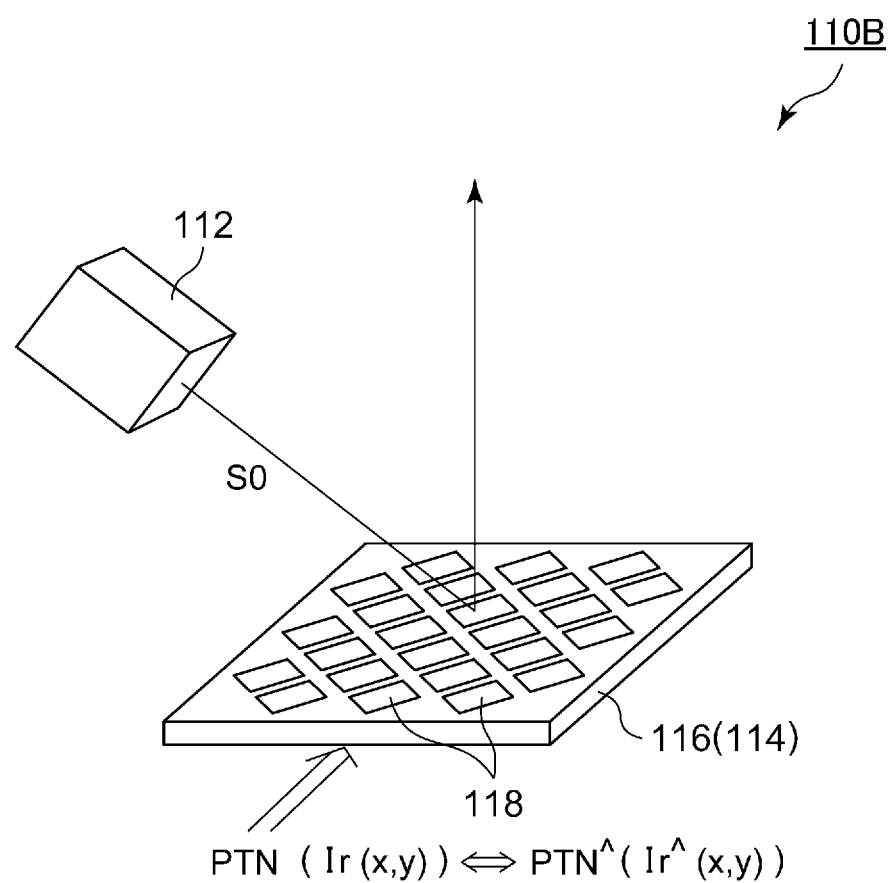
FIG. 7 is a diagram showing an illumination apparatus according to an example 2.

FIG. 7 is a diagram showing an illumination apparatus 110B according to an example 2. The illumination apparatus 110B includes a single light source 112 and a DMD 116 configured as a patterning device 114. The light source 112 generates an input beam S0 having a uniform intensity distribution. As the light source 112, a laser, light-emitting diode, or the like, may be employed.

The patterning device 114 receives the supply of a pattern signal PTN (image data) generated by the pattern generator 132. In this state, the reference light S1_1 having an intensity distribution $I_r(x,y)$ that corresponds to the pattern signal PTN is generated. Subsequently, the pattern generator 132 generates a pattern signal PTNˆ that is obtained by inverting the pattern signal PTN, and supplies the pattern signal PTNˆ thus generated to the patterning device 114. With this, the reference light S1_2 having an intensity distribution $I_r\hat{\,}$ that corresponds to the inverted pattern signal PTNˆ is generated.

In FIG. 7, as the patterning device 114, a patterning device such as a transmissive or reflective liquid crystal device or the like may be employed.

Embodiment 2

Figure 8:
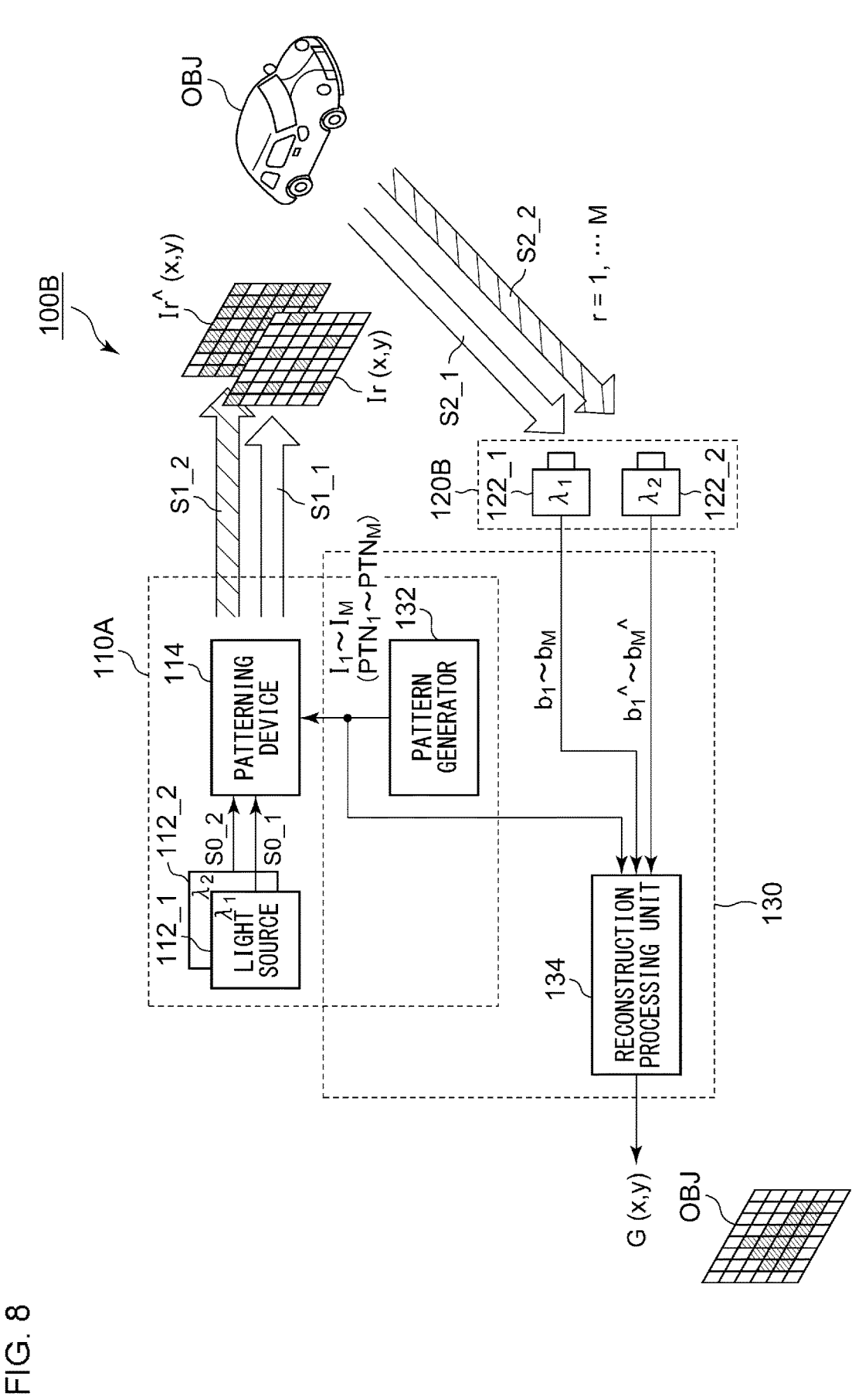
FIG. 8 is a block diagram showing an imaging apparatus according to an embodiment 2.

FIG. 8 is a block diagram showing an imaging apparatus 100B according to an embodiment 2. In the embodiment 2, the first light source 112_1 and the second light source 112_2 generate the input beams S0_1 and S0_2 having different wavelengths $\lambda_1$ and $\lambda_2$.

The photodetector 120B includes two detectors 122_1 and 122_2 having different wavelength sensitivity characteristics that correspond to the input beams S0_1 and S0_2 described above. The first detector 122_1 is sensitive to the first wavelength $\lambda_1$, and is not sensitive to the second wavelength $\lambda_2$. In contrast, the second detector 122_2 is sensitive to the second wavelength $\lambda_2$, and is not sensitive to the first wavelength $\lambda_1$. The first detector 122_1 generates M first detection intensities $b_1$ through $b_M$ that correspond to M irradiations of the first reference light S1_1. The second detector 122_2 generates M second detection intensities $b_1\hat{\,}$ through $b_M\hat{\,}$ that correspond to M irradiations of the second reference light S1_2.

With the embodiment 2, the two beams of reference light S1_1 and S1_2 are irradiated to a common region, i.e., a spatially overlapping region.

Figure 9:
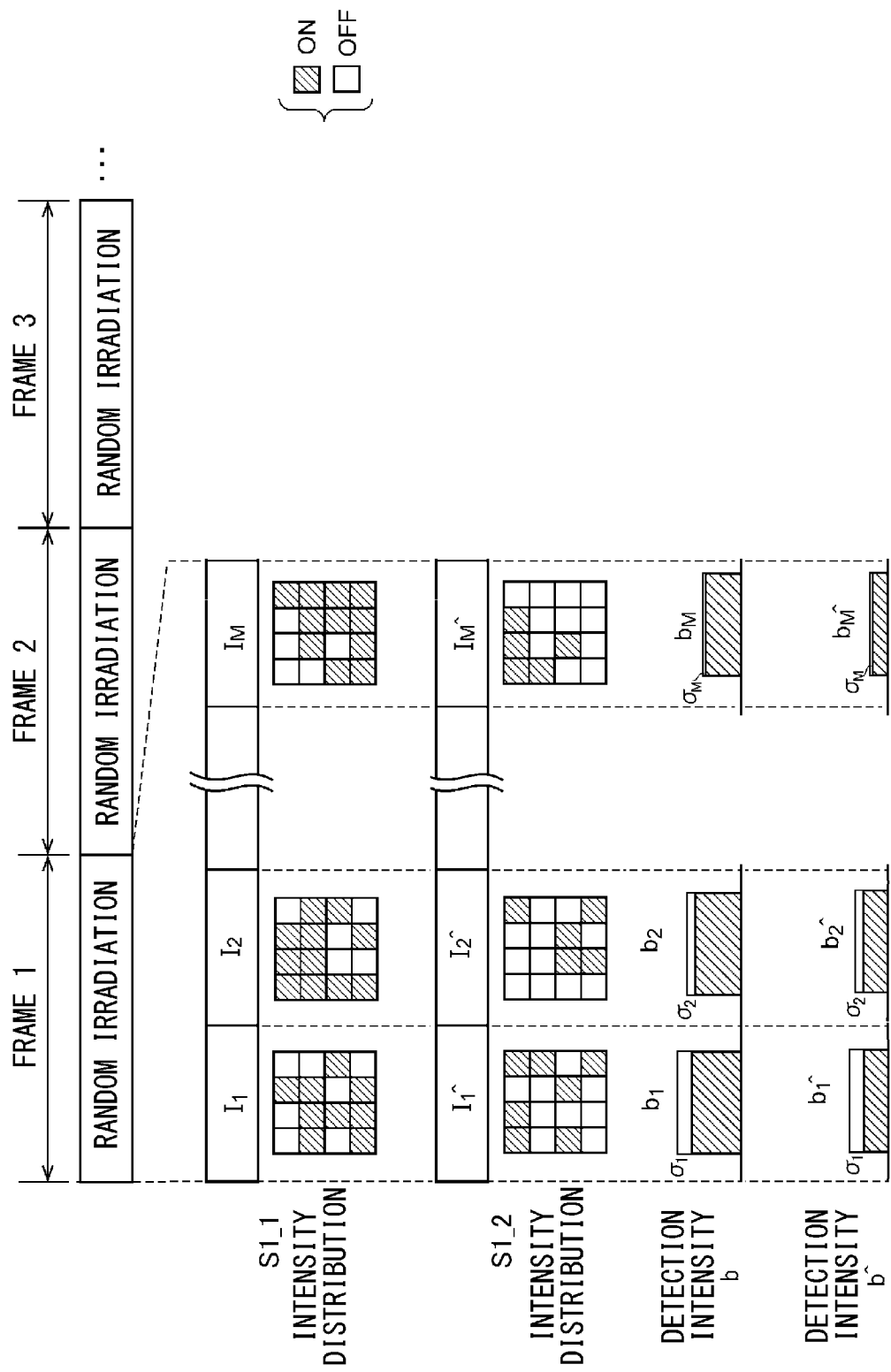
FIG. 9 is a time chart for explaining the operation of the imaging apparatus shown in FIG. 8.

The above is the configuration of the imaging apparatus 100B. Next, description will be made regarding the operation thereof. FIG. 9 is a time chart for explaining the operation of the imaging apparatus 100B shown in FIG. 8. With the embodiment 2, the two light sources 112_1 and 112_2 are turned on at the same time. The two beams of reference light S1_1 and S1_2 are irradiated to an object at the same time. The beams of reflected light S2_1 and S2_2 corresponding to the beams of reference light S1_1 and S1_2 are incident to the photodetector 120B at the same time. The first detection intensity $b_r$ and the second detection intensity $b_r\hat{\,}$ are generated at the same time by means of the two detectors 122_1 and 122_2. The other operations thereof are the same as those described in the example 1.

With the embodiment 2, as with the example 1, such an arrangement is capable of acquiring a reconstructed image G(x,y) with high image quality and with reduced noise effects.

Furthermore, such an arrangement is capable of irradiating two beams of reference light S1_1 and S1_2 at the same time. This allows the measurement time for each frame to be reduced to half of that required in the example 1.

Alternatively, in a case in which the same measurement time for each frame as that in the example 1 is employed, the irradiation time of the beams of reference light S1_1 and S1_2 for each pattern may be set to twice that employed in the example 1. In this case, the signal levels of the detection intensities $b_r$ and $b_r\hat{\,}$ become large. This allows the first reconstructed image $G_1(x,y)$ and the second reconstructed image $G_2(x,y)$ to have improved image quality before image combining. As a result, this provides the final image G(x,y) with improved image quality.

It should be noted that, in a case in which there is a large difference between the first wavelength $\lambda_1$ and the second wavelength $\lambda_2$, this leads to a large difference in the reflection ratio with respect to the same object between the first wavelength $\lambda_1$ and the second wavelength $\lambda_2$. In this case, reflection ratio correction may preferably be performed.

In order to provide the reflection ratio correction, the first reference light S1_1 having the first wavelength $\lambda_1$ is irradiated to an object with a uniform intensity distribution (e.g., all pixels have a maximum intensity, or an intensity of "1"), and the detection intensity $b_0$ is acquired in this state. Furthermore, the second reference light S1_2 having the second wavelength $\lambda_2$ is irradiated to the same object with the same intensity distribution (it should be noted that it has no complementary relation with the first reference light S1_1), and the detection intensity $b_0\hat{}$ is acquired in this state. The detection intensities $b_0$ and $b_0\hat{}$ are proportional to the reflection ratios of the object with respect to the wavelengths $\lambda_1$ and $\lambda_2$, respectively. The processing device 130 corrects at least one from among the first detection intensity $b_r$ and the second detection intensity $b_r\hat{}$ acquired in the subsequent operations using $b_0$ and $b_0\hat{}$ thus acquired.

For example, $b_r$ may be used as it is, and $b_r\hat{}$ may be multiplied by the coefficient $b_0\hat{}/b_0$ so as to obtain a corrected detection intensity $b_r\hat{}$. That is to say, the correlation calculation may be performed using $b_r$ without correction and $b_r\hat{}$ thus corrected. Conversely, $b_r\hat{}$ may be used as it is, and $b_r$ may be corrected by multiplying $b_r$ by the coefficient $b_0/b_0\hat{}$. That is to say, the correlation calculation may be performed using $b_r$ thus corrected and $b_r\hat{}$ without correction.

Alternatively, in a case in which the intensity of the input beam S0 before patterning can be adjusted, the light intensity to be generated by the light source 112 may be corrected. In this case, the input beam S0 having the first wavelength $\lambda_1$ may be used without adjustment, and the intensity of the input beam S0 having the second wavelength $\lambda_2$ may be multiplied by $b_0\hat{}/b_0$. Conversely, the input beam S0 having the second wavelength $\lambda_2$ may be used without adjustment, and the intensity of the input beam S0 having the first wavelength $\lambda_1$ may be multiplied by $b_0/b_0\hat{}$.

Modification 2.1

It should be noted that, in the second embodiment 2, the two light sources 112_1 and 112_2 may be alternately turned on so as to alternately irradiate two beams of reference light S1_1 and S1_2.

Modification 2.2

The reconstruction processing unit 134 may calculate the first correlation expression represented by Expression (2) using the results of M irradiations of the first reference light S1_1, so as to reconstruct the first reconstructed image $G_1(x,y)$. Also, the reconstruction processing unit 134 may calculate the second correlation expression represented by Expression (3) using the results of M irradiations of the second reference light S1_2, so as to reconstruct the second reconstructed image $G_2(x,y)$. Subsequently, each pair of the corresponding pixels of the two reconstructed images $G_1(x,y)$ and $G_2(x,y)$ may be added so as to generate a final reconstructed image $G(x,y)$. In this case, such an arrangement is also capable of canceling the noise effects.

Modification 2.3

Description has been made above regarding examples in which the two patterns having complementary intensity distributions are used for the noise cancelation. However, the present invention is not restricted to such examples. In a modification 1.3, the reconstruction processing unit 134 calculates the first correlation expression represented by Expression (2) using the results of M irradiations of the first reference light S1_1, so as to reconstruct the first reconstructed image $G_1(x,y)$. Furthermore, the reconstruction processing unit 134 calculates the second correlation expression represented by Expression (3) using the results of M irradiations of the second reference light S1_2, so as to reconstruct the second reconstructed image $G_2(x,y)$.

Subsequently, from among the two reconstructed images $G_1(x,y)$ and $G_2(x,y)$, the reconstructed image having a higher image quality may be selected as the final reconstructed image. For example, the reconstructed image including an object having a clear edge may be selected. This arrangement provides no noise cancelation. However, such an arrangement is capable of selecting a more suitable pattern with respect to a subject, thereby providing improved image quality.

Embodiment 3

Figure 10:
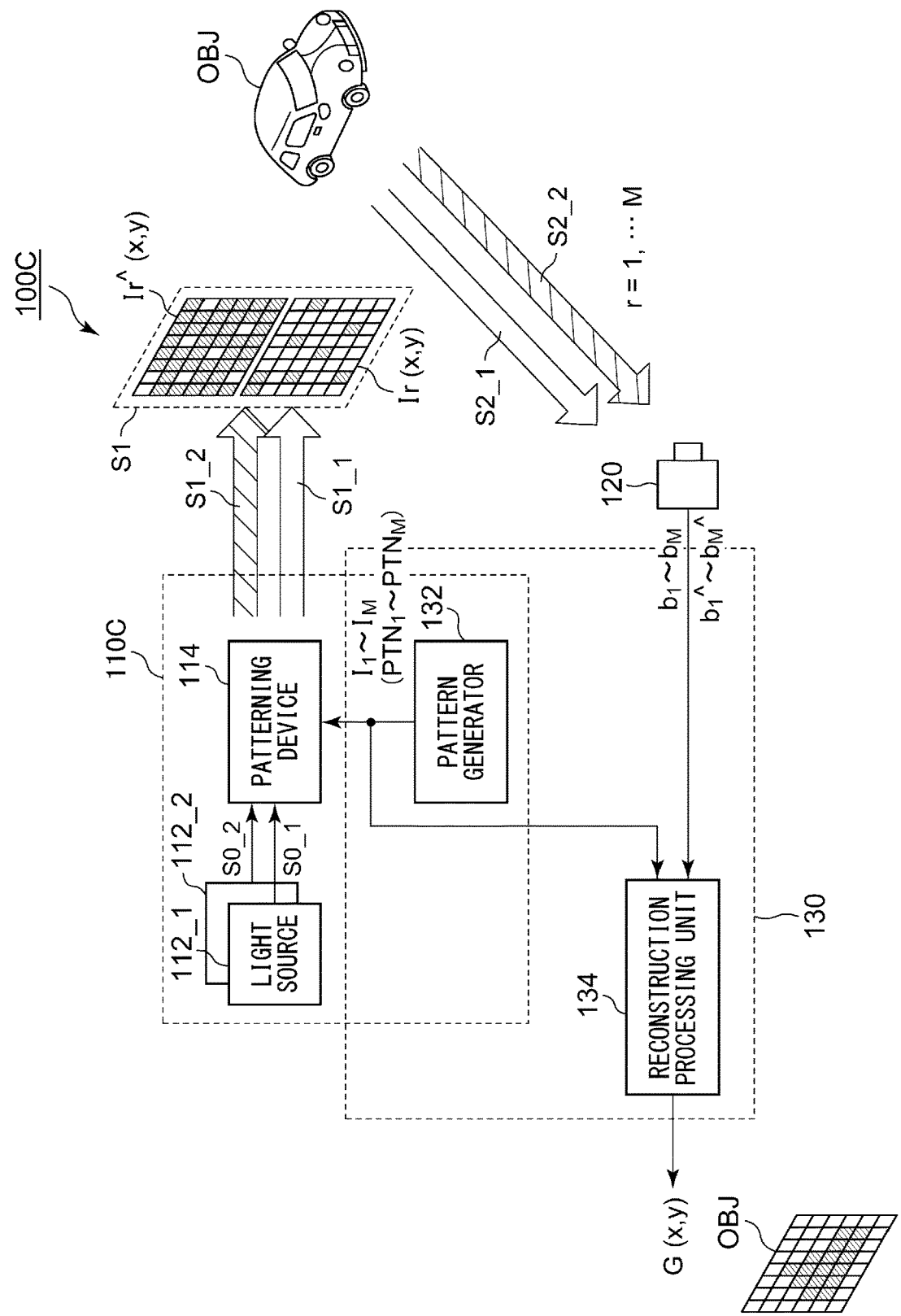
FIG. 10 is a block diagram showing an imaging apparatus according to an embodiment 3.

FIG. 10 is a diagram showing an imaging apparatus 100C according to an embodiment 3. As with the embodiments 1 and 2, the imaging apparatus 100C is configured as a correlation function image sensor using the principle of ghost imaging.

The illumination apparatus 110C irradiates two beams of reference light S1_1 and S1_2 to spatially different positions. There is a complementary relation in the intensity distribution between them. In the present embodiment, the two beams of reference light S1_1 and S1_2 have the same wavelength, and are irradiated at the same time. In the embodiment 3, the two beams of reference light S1_1 and S1_2 are handled as a single beam of reference light S1.

The photodetector 120 simultaneously detects the two beams of reflected light S2_1 and S2_2 that respectively correspond to the two beams of reference light S1_1 and S1_2. The detection intensity $b_r$ represents the energy of the two beams of reflected light S2_1 and S2_2 obtained by the r-th irradiation. It should be noted that $b_r$ includes $b_r\hat{}$.

The reconstruction processing unit 134 connects the intensity distributions $I_r(x,y)$ and $I_r\hat{}(x,y)$ so as to generate the intensity distribution of the reference light S1. Furthermore, the reconstruction processing unit 134 calculates the correlation between the intensity distribution of the reference light S1 and the detection intensity $b_r$, so as to generate a single reconstructed image $G(x,y)$.

With the imaging apparatus 100C, this provides sensing of a region that is double that as described above.

Example 3

Figure 11A:
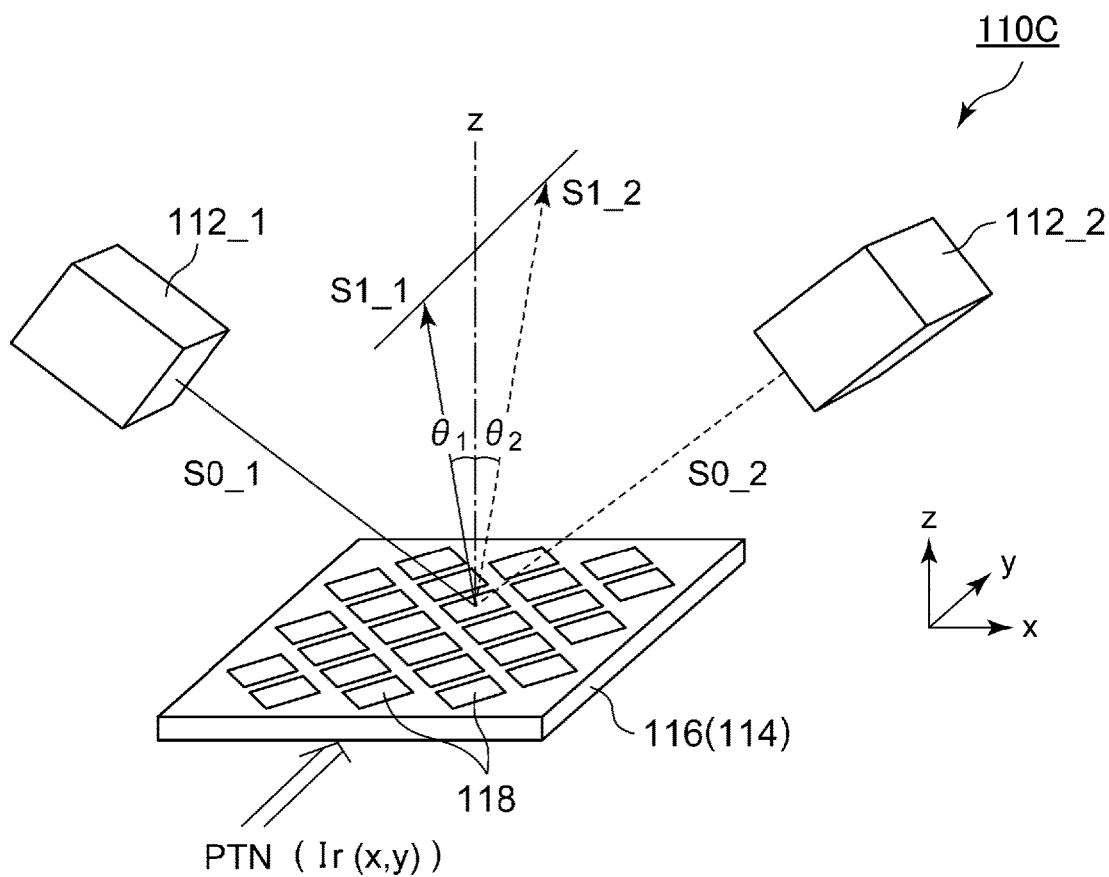
FIGS. 11A and 11B are diagrams each showing an illumination apparatus according to an example 3.
Figure 11B:
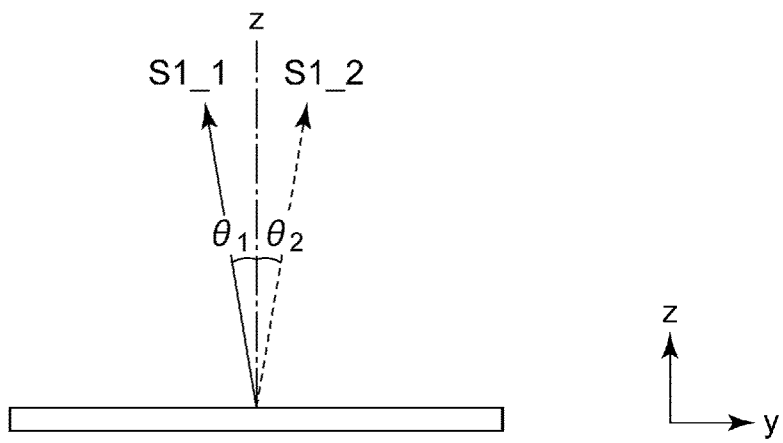

FIGS. 11A and 11B are diagrams each showing an illumination apparatus 110C according to an example 3. The illumination apparatus 110C has a basic configuration including a first light source 112_1, a second light source 112_2, and a DMD 116 configured as a patterning device 114.

With the illumination apparatus 110A or 110B, the input beams S0_1 and S0_2 incident to the same pixel (micromirror) are reflected in substantially the same direction. Accordingly, the two output beams S1_1 and S1_2 are irradiated to substantially the same region, i.e., an overlapping region.

In contrast, in the example 3, as shown in FIG. 11B, there is a difference between the declination angles $\theta_1$ and $\theta_2$ of the two output beams S1_1 and S1_2 from the Z axis of the YZ plane.

Figure 12:
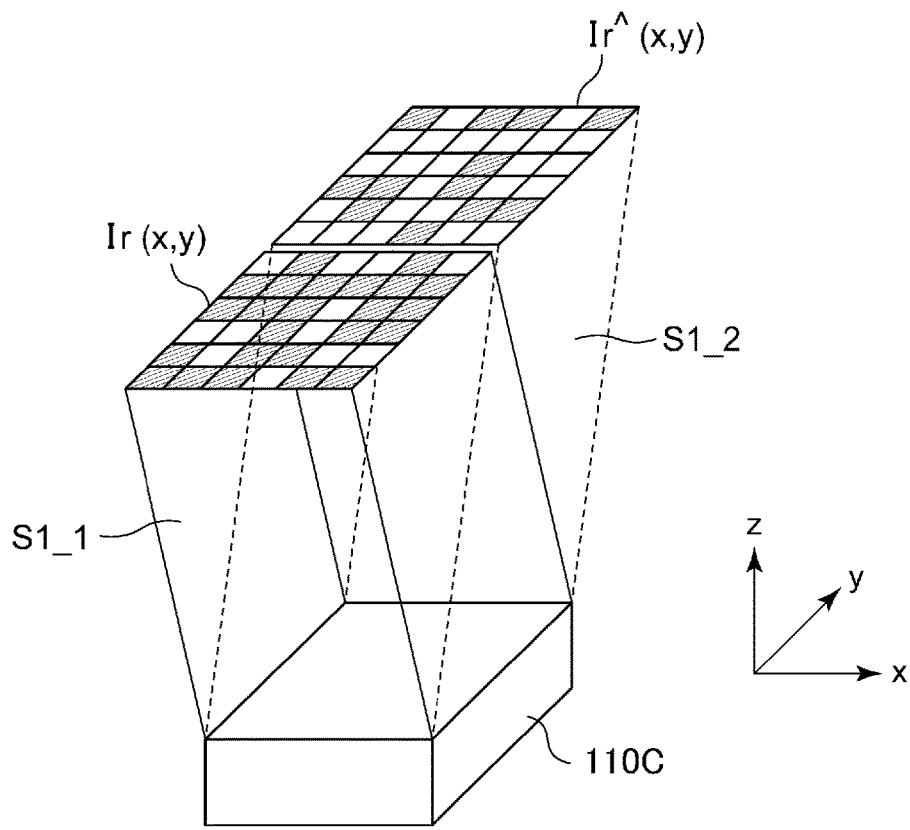
FIG. 12 is a diagram for explaining the operation of the illumination apparatus shown in FIG. 11.

The above is the configuration of the illumination apparatus 110C. Next, description will be made regarding the operation thereof. FIG. 12 is a diagram for explaining the operation of the illumination apparatus 110C shown in FIG.

11. There is a difference in the output angle θ in the yz plane between the first output beam S1_1 and the second output beam S1_2. Accordingly, the two output beams S1_1 and S1_2 are irradiated to different regions shifted in the y-axis direction. The two output beams S1_1 and S1_2 have complementary intensity distributions $I_r(x,y)$ and $I_r\hat{\ }(x,y)$, which is the same point as in the embodiment 1.

The above is the operation of the illumination apparatus 110C. With the illumination apparatus 110C, complementary patterns can be irradiated to regions that do not overlap spatially. The irradiations of the two patterns may be executed at the same time or at different timings. The irradiation timing may preferably be determined according to the usage.

Next, description will be made regarding the usage of the illumination apparatus 110C according to the example 3. As with the illumination apparatus 110A, the illumination apparatus 110C can be employed for an imaging apparatus.

Embodiment 4

The imaging apparatus 100D according to an embodiment 4 is a modification of the embodiment 3 (FIG. 10), so as to generate the two beams of reference light S1_1 and S1_2 in a time-sharing manner. With the embodiment 4, the first detection intensity $b_r$ is detected by the irradiation of the first reference light S1_1. Furthermore, the second detection intensity $b_r\hat{\ }$ is detected by the irradiation of the second reference light S1_2. The reconstruction processing unit 134 generates the first reconstructed image $G_1(x,y)$ with respect to the irradiation region of the first reference light S1_1. Furthermore, the reconstruction processing unit 134 generates the second reconstructed image $G_2(x,y)$ with respect to the irradiation region of the second reference light S1_2. Subsequently, the two reconstructed images $G_1(x,y)$ and $G_2(x,y)$ are connected, thereby generating an image for the entire irradiation region.

Embodiment 5

In the embodiment 3 (FIG. 10), the two beams of reference light S1_1 and S1_2 respectively having different wavelengths $\lambda_1$ and $\lambda_2$ may be irradiated at the same time. In this case, the photodetector 120 may preferably be configured as shown in FIG. 8. With this, images with respect to the irradiation regions that correspond to the two beams of reference light S1_1 and S1_2 can be separately reconstructed.

The following features can be added to the embodiments 3 through 5.

Wavelength Control

The light sources 112_1 and 112_2 may be configured to be capable of controlling the wavelengths $\lambda_1$ and $\lambda_2$ of the two input beams S0_1 and S0_2. With such an arrangement, the wavelengths $\lambda_1$ and $\lambda_2$ may be adaptively optimized according to the color and material of the subject. Specifically, a wavelength that provides high reflection ratio may preferably be selected based on the color or material of the subject. For example, let us consider a case in which the reference light S1_1 is irradiated to a first object having a red color and the reference light S1_2 is irradiated to a second object having a blue color. In this case, the wavelength $\lambda_1$ may be adjusted such that it is closer to red, and the wavelength $\lambda_2$ may be adjusted such that it is closer to blue.

Alternatively, in a case in which there is a difference in a material between the first object and the second object and the wavelengths $\lambda_1$ and $\lambda_2$ are within the infrared wavelength range, a wavelength that provides a high reflection ratio may preferably be selected for each material.

Alternatively, such a wavelength may be selected according the surrounding environment. For example, when rainfall, fog, snowfall, a sandstorm, smog, or the like occurs, a particular waveform is readily absorbed during light propagation. In this case, a particular waveform that is less likely to be absorbed during light propagation may preferably be selected.

For example, the wavelength $\lambda_4$ is swept while maintaining the reference light S1_#("#"=1, 2) at a uniform intensity distribution (all pixels are 1). With such an arrangement, the wavelength $\lambda_\#$ that provides the highest detection intensity may be acquired, thereby determining an optimum wavelength.

Light Intensity Control

The light sources 112_1 and 112_2 may be configured to be capable of controlling the light intensities of the two input beams S0_1 and S0_2. In this case, the light intensities may be dynamically changed according to the distance to the subject or the reflection ratio of the subject.

Description has been made above regarding the present invention with reference to the embodiments. The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Usage

Figure 13:
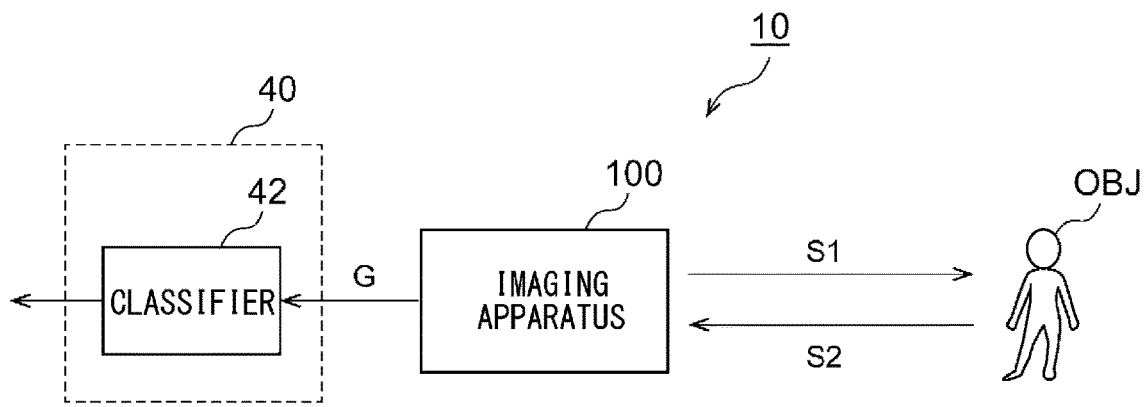
FIG. 13 is a block diagram showing an object identification system.

Next, description will be made regarding the usage of the imaging apparatus 100. FIG. 13 is a block diagram showing an object identification system 10. The object identification system 10 is mounted on a vehicle such as an automobile, motorcycle, or the like. The object identification system 10 judges the kind (category) of an object OBJ that exists in the vicinity of the vehicle.

The object identification system 10 includes the imaging apparatus 100 and a processing device 40. As described above, the imaging apparatus 100 irradiates the reference light S1 to the object OBJ, and measures the reflected light S2, so as to generate a reconstructed image G.

The processing device 40 processes the output image G output from the imaging apparatus 100, and judges the position and the kind (category) of the object OBJ.

A classifier 42 included in the processing device 40 receives the image G as its input, and judges the position and the kind of the object OBJ included in the image G. The classifier 42 is implemented based on a model generated by machine learning. The algorithm employed by the classifier 42 is not restricted in particular. Examples of algorithms that can be employed include You Only Look Once (YOLO), Single Shot MultiBox Detector (SSD), Region-based Convolutional Neural Network (R-CNN), Spatial Pyramid Pooling (SPPnet), Faster R-CNN, Deconvolution-SSD (DSSD), Mask R-CNN, etc. Also, other algorithms that will be developed in the future may be employed.

The above is the configuration of the object identification system 10. With such an arrangement employing the imaging apparatus 100 as a sensor of the object identification system 10, this provides the following advantages.

With such an arrangement employing the imaging apparatus 100, i.e., a quantum radar camera, this provides dramatically improved noise resistance. For example, when the vehicle travels in rain, snow, or fog, it is difficult to recognize the object OBJ with the naked eye. In contrast, with such an arrangement employing the imaging apparatus 100, this allows a reconstructed image G of the object OBJ to be acquired without the effects of rain, snow, or fog.

Also, with such an arrangement structured to employ the imaging apparatus 100 according to the embodiment, this allows a high-quality image to be obtained with reduced noise effects.

Usage

Figure 14:
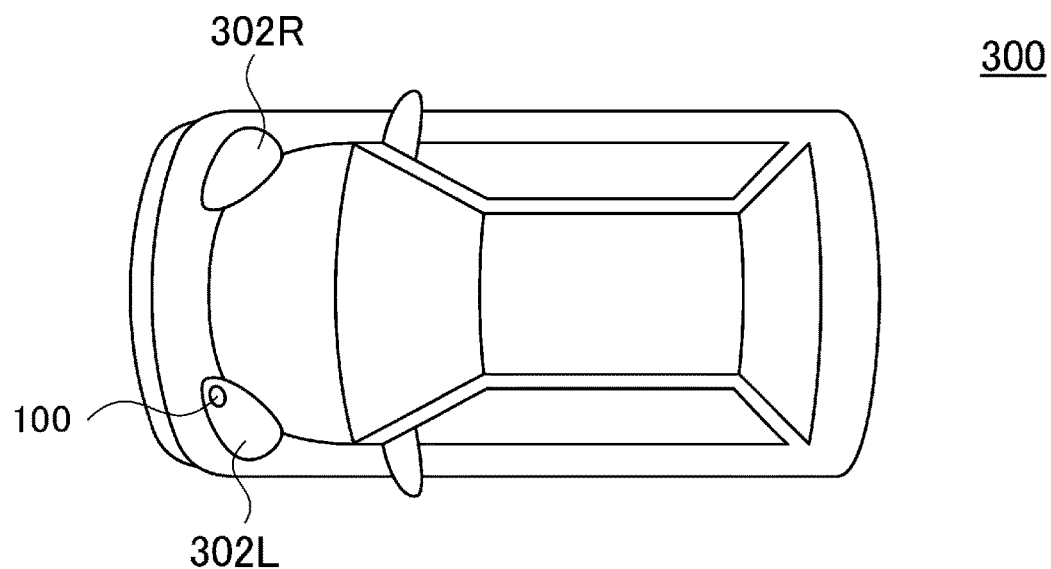
FIG. 14 is a diagram showing an automobile provided with an object identification system.

FIG. 14 is a diagram showing an automobile provided with the object identification system 10. An automobile 300 is provided with headlamps 302L and 302R. The imaging apparatus 100 is built into at least one from among the headlamps 302L and 302R. Each headlamp 302 is positioned at a frontmost end of the vehicle body, which is most advantageous as a position where the imaging apparatus 100 is to be installed for detecting an object in the vicinity.

Figure 15:
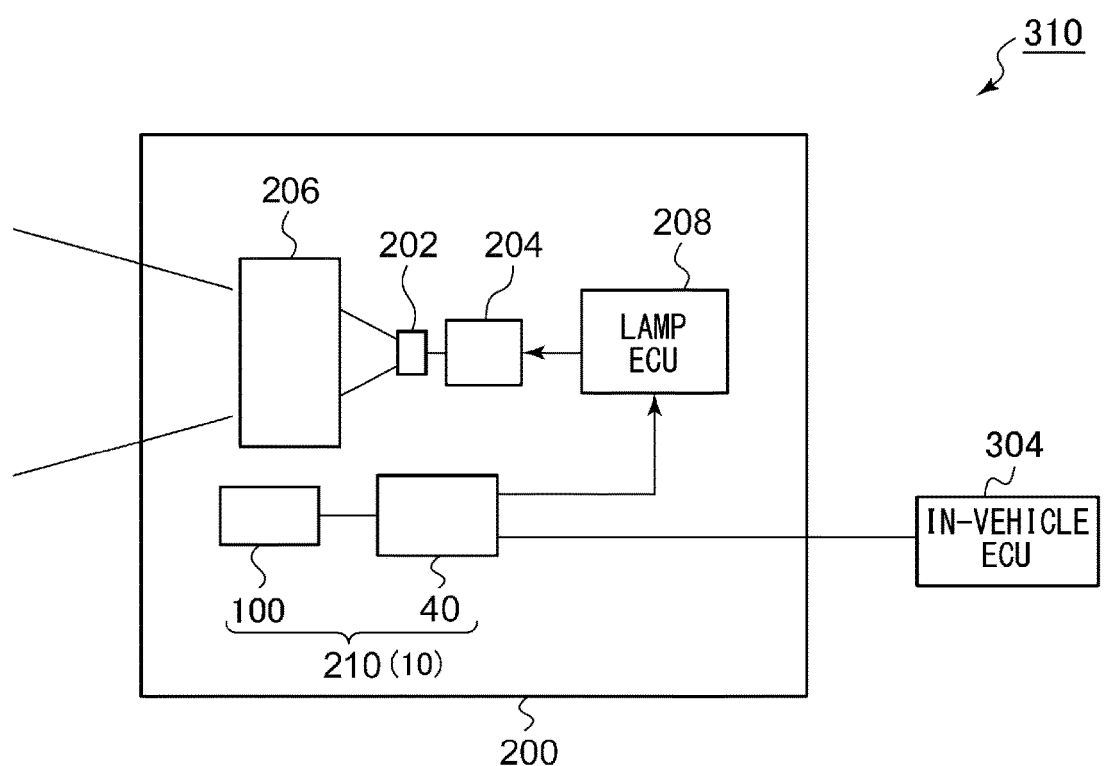
FIG. 15 is a block diagram showing an automotive lamp provided with an object identification system.

FIG. 15 is a block diagram showing an automotive lamp 200 provided with an object detection system 210. The automotive lamp 200 forms a lamp system 310 together with an in-vehicle ECU 304. The automotive lamp 200 includes a light source 202, a lighting circuit 204, and an optical system 206. Furthermore, the automotive lamp 200 includes the object detection system 210. The object detection system 210 corresponds to the object identification system 10 described above. The object detection system 210 includes the imaging apparatus 100 and the processing device 40.

Also, the information with respect to the object OBJ detected by the processing device 40 may be used to support the light distribution control operation of the automotive lamp 200. Specifically, a lamp ECU 208 generates a suitable light distribution pattern based on the information with respect to the kind of the object OBJ and the position thereof generated by the processing device 40. The lighting circuit 204 and the optical system 206 operate so as to provide the light distribution pattern generated by the lamp ECU 208.

Also, the information with respect to the object OBJ detected by the processing device 40 may be transmitted to the in-vehicle ECU 304. The in-vehicle ECU may support autonomous driving based on the information thus transmitted.

Description has been made regarding the present disclosure with reference to the embodiments using specific terms. However, the above-described embodiments show only an aspect of the mechanisms and applications of the present disclosure. Rather, various modifications and various changes in the layout can be made without departing from the spirit and scope of the present invention defined in appended claims.

Clauses Describing Features of the Disclosure

Clause 14. An illumination apparatus comprising:
a digital micromirror device (DMD) comprising a plurality of micromirrors that correspond to a plurality of pixels, and each structured to be tilted independently around a hinge axis in a first direction and a second direction;
a first light source structured to irradiate a first input beam to the DMD; and
a second light source structured to irradiate a second input beam to the DMD,
wherein a part of the first input beam incident to the micromirror tilted in the first direction is projected to the exterior as a part of a first output beam, and the part of the first input beam incident to the micromirror tilted in the second direction is not projected to the exterior,
and wherein a part of the second input beam incident to the micromirror tilted in the second direction is projected to the exterior as a part of a second output beam, and the part of the second input beam incident to the micromirror tilted in the first direction is not projected to the exterior.
and wherein the first output beam and the second output beam have complementary intensity distributions.

Clause 15. The illumination apparatus according to Clause 14, wherein the first input beam and the second input beam have different wavelengths.

Clause 16. The illumination apparatus according to Clause 15, wherein the first light source and the second light source are turned on at the same time.

Clause 17. The illumination apparatus according to Clause 14, wherein the first input beam and the second input beam have the same wavelength.

Clause 18. The illumination apparatus according to Clause 17, wherein the first light source and the second light source are turned on in an exclusive manner.

Clause 19. The illumination apparatus according to Clause 14, wherein the first output beam and the second output beam are irradiated to a spatially overlapping region.

Clause 20. The illumination apparatus according to Clause 14, wherein the first output beam and the second output beam are irradiated to regions that do not overlap.

Clause 21. The illumination apparatus according to Clause 14, wherein the first input beam and the second input beam each have a variable wavelength.

Clause 22. An automotive lamp comprising the illumination apparatus according to Clause 14.

Clause 23. An imaging apparatus comprising:
the illumination apparatus according to Clause 14;
a photodetector structured to measure reflected light from an object; and
a processing device structured to execute a first correlation calculation based on a result of irradiation of the first output beam and a second correlation calculation based on a result of irradiation of the second output beam.

Clause 24. The imaging apparatus according to Clause 23, wherein the first output beam and the second output beam are irradiated to a spatially overlapping region,
and wherein the processing device is structured to combine the first correlation calculation and the second correlation calculation so as to generate a final reconstructed image.

Clause 25. An automobile comprising an imaging apparatus according to Clause 23.

What is claimed is:
1. An imaging apparatus comprising:
an illumination apparatus structured to irradiate an object with first reference light having a first intensity distribution $I_r(x,y)$ and second reference light having a second intensity distribution $I'_r(x,y)$ that has a comple- mentary (x,y) relation with the first intensity distribution $I_r(x,y)$, wherein r (=1, 2, ... M) represents r-th irradiation;
a photodetector structured to measure reflected light from the object; and
a processing device structured to perform first correlation calculation represented by expression (1) based on a result of irradiation of the first reference light and second correlation calculation represented by expression (2) based on a result of irradiation of the second reference light, wherein $b_r$ represents a value of a detection intensity measured when the object is irradiated with the first reference light having the first intensity distribution $I_r(x,y)$, $\hat{b}_r$ represents a value of a detection intensity measured when the object is irradiated with the second reference light having the second intensity distribution $\hat{I}_r(x,y)$, and M represents a number of irradiations $$G_1(x, y) = \frac{1}{M}\sum_{r=1}^{M}[\{b_r - \langle b \rangle\} \cdot I_r(x, y)] \qquad (1)$$

$$\langle b \rangle = \frac{1}{M}\sum_{r=1}^{M} b_r$$

$$G_2(x, y) = \frac{1}{M}\sum_{r=1}^{M}[\{\hat{b}_r - \langle \hat{b} \rangle\} \cdot \hat{I}_r(x, y)] \qquad (2)$$

$$\langle \hat{b} \rangle = \frac{1}{M}\sum_{r=1}^{M} \hat{b}_r.$$

2. The imaging apparatus according to claim 1, wherein the processing device is structured to generate a final reconstructed image G(x,y) based on expression (3)

$$G(x, y) =$$
$$G_1(x,y) + G_2(x,y) = \frac{1}{M}\sum_{r=1}^{M}[\{b_r - \langle b \rangle\} \cdot I_r(x,y) + \{\hat{b}_r - \langle \hat{b} \rangle\} \cdot \hat{I}_r(x,y)]. \qquad (3)$$

3. The imaging apparatus according to claim 1, wherein the processing device is structured to output a first reconstructed image $G_1(x,y)$ of the object by the first correlation calculation represented by the expression (1), and to reconstruct a second reconstructed image $G_2(x,y)$ of the object by the second correlation calculation represented by the expression (2).

4. The imaging apparatus according to claim 1, wherein the first reference light and the second reference light have a same wavelength, and are irradiated in a time-sharing manner.

5. The imaging apparatus according to claim 1, wherein the first reference light has a first wavelength, and the second reference light has a second wavelength that differs from the first wavelength,
and wherein the photodetector comprises:
a first detector that is sensitive to the first wavelength, and not sensitive to the second wavelength, and
a second detector that is sensitive to the second wavelength, and not sensitive to the first wavelength.

6. The imaging apparatus according to claim 5, wherein the first reference light and the second reference light are irradiated at a same time.

7. The imaging apparatus according to claim 5, wherein the processing device is structured to correct an output of the first detector and an output of the second detector.

8. The imaging apparatus according to claim 7, wherein a coefficient required for correction in the processing device is generated based on a first detection intensity obtained with respect to reflected light from a given object in a state in which the first reference light is irradiated with a uniform intensity distribution and a second detection intensity obtained with respect to reflected light from the same object in a state in which the second reference light is irradiated with a uniform intensity distribution.

9. The imaging apparatus according to claim 1, wherein the illumination apparatus comprises:
a digital micromirror device (DMD) comprising a plurality of micromirrors that correspond to a plurality of pixels, and each structured to be tilted independently around a hinge axis in a first direction and a second direction;
a first light source structured to irradiate a first input beam to the DMD; and
a second light source structured to irradiate a second input beam to the DMD,
wherein a part of the first input beam incident to each micromirror of the plurality of micromirrors tilted in the first direction is projected to the object as a first output beam, and the part of the first input beam incident to each micromirror of the plurality of micromirrors tilted in the second direction is not projected to the object,
and wherein a part of the second input beam incident to each micromirror tilted in the second direction is projected to the object as a second output beam, and the part of the second input beam incident to each micromirror tilted in the first direction is not projected to the object.

10. An automotive lamp comprising the imaging apparatus according to claim 1.

11. An automobile comprising the imaging apparatus according to claim 1.

12. An imaging method comprising:
irradiating an object with first reference light having a first intensity distribution $I_r(x,y)$;
irradiating the object with second reference light having a second intensity distribution $\hat{I}_r(x,y)$ that has a complementary (x,y) relation with the first intensity distribution $I_r(x,y)$, wherein r (=1, 2, ... M) represents r-th irradiation;
measuring reflected light from the object in a state in which the first reference light having the first intensity distribution $I_r(x,y)$ is irradiated, so as to generate a first detection intensity $b_r$;
measuring reflected light from the object in a state in which the second reference light having the second intensity distribution $\hat{I}_r(x,y)$ is irradiated, so as to generate a second detection intensity $\hat{b}_r$; and
executing a first correlation calculation represented by expression (1) and a second correlation calculation represented by expression (2)

$$G_1(x, y) = \frac{1}{M}\sum_{r=1}^{M}[\{b_r - \langle b \rangle\} \cdot I_r(x, y)] \qquad (1)$$

-continued $$\langle b \rangle = \frac{1}{M}\sum_{r=1}^{M} b_r$$

$$G_2(x, y) = \frac{1}{M}\sum_{r=1}^{M}\left[\{\hat{b}_r - \langle \hat{b} \rangle\} \cdot \hat{I}_r(x, y)\right] \quad (2)$$

$$\langle \hat{b} \rangle = \frac{1}{M}\sum_{r=1}^{M} \hat{b}_r.$$

13. The imaging method according to claim 12, further comprising generating a final reconstructed image G(x,y) represented in expression (3)

$$G(x, y) = G_1(x, y) + G_2(x, y) = \frac{1}{M}\sum_{r=1}^{M}\left[\{b_r - \langle b \rangle\} \cdot I_r(x, y) + \{\hat{b}_r - \langle \hat{b} \rangle\} \cdot \hat{I}_r(x, y)\right]. \quad (3)$$

* * * * *